(12) United States Patent
Baik et al.

(10) Patent No.: US 11,544,940 B2
(45) Date of Patent: Jan. 3, 2023

(54) HYBRID LANE ESTIMATION USING BOTH DEEP LEARNING AND COMPUTER VISION

(71) Applicant: QUALCOMM Incorporated, San Diego, CA (US)

(72) Inventors: Young-Ki Baik, Seoul (KR); Jeong-Kyun Lee, Seoul (KR); Seok-Soo Hong, Seoul (KR); Duck Hoon Kim, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 443 days.

(21) Appl. No.: 16/733,111

(22) Filed: Jan. 2, 2020

(65) Prior Publication Data

US 2020/0218907 A1    Jul. 9, 2020

Related U.S. Application Data

(60) Provisional application No. 62/788,745, filed on Jan. 4, 2019.

(51) Int. Cl.
| | | |
|---|---|---|
| *B62D 6/00* | (2006.01) | |
| *G06V 20/56* | (2022.01) | |
| *B60R 11/04* | (2006.01) | |
| *G06F 17/16* | (2006.01) | |
| *G06N 3/02* | (2006.01) | |

(52) U.S. Cl.
CPC ............ *G06V 20/588* (2022.01); *B60R 11/04* (2013.01); *G06F 17/16* (2013.01); *G06N 3/02* (2013.01)

(58) Field of Classification Search
CPC .... G06V 20/588; G06V 10/454; G06V 10/82; B60R 11/04; G06F 17/16; G06N 3/02; G06N 20/00; G06K 9/6292
USPC .......................................................... 701/28
See application file for complete search history.

(56) References Cited

U.S. PATENT DOCUMENTS

| | | | |
|---|---|---|---|
| 2016/0063516 A1* | 3/2016 | Terrazas | G06V 10/56 |
| | | | 705/7.29 |
| 2017/0267177 A1* | 9/2017 | Nariyambut Murali | ...... |
| | | | G06N 3/0454 |
| 2017/0300763 A1* | 10/2017 | Zou | G06V 10/82 |
| 2017/0300767 A1* | 10/2017 | Zou | G06K 9/6269 |
| 2020/0117916 A1* | 4/2020 | Liu | G06N 3/08 |
| 2020/0380270 A1* | 12/2020 | Cox | G01C 21/3819 |

* cited by examiner

*Primary Examiner* — Gims S Philippe
(74) *Attorney, Agent, or Firm* — Muncy, Geissler, Olds & Lowe, P.C.

(57) ABSTRACT

Disclosed are techniques for lane estimation. In aspects, a method includes receiving a plurality of camera frames captured by a camera sensor of a vehicle, assigning a first subset of the plurality of camera frames to a deep learning (DL) detector and a second subset of the plurality of camera frames to a computer vision (CV) detector based on availability of the DL and CV detectors, identifying a first set of lane boundary lines in a first camera frame processed by the DL detector, identifying a second set of lane boundary lines in a second camera frame processed by the CV detector, generating first and second sets of lane models based on the first and second sets of lane boundary lines, and updating a set of previously identified lane models based on the first set of lane models and/or the second set of lane models.

30 Claims, 16 Drawing Sheets

One correspondence case

More than two correspondence case

HYBRID LANE ESTIMATION USING BOTH DEEP LEARNING AND COMPUTER VISION

CROSS-REFERENCE TO RELATED APPLICATIONS

The present Application for Patent claims the benefit of U.S. Provisional Application No. 62/788,745, entitled "HYBRID LANE ESTIMATION USING BOTH DEEP LEARNING AND COMPUTER VISION BASED ON ROAD GEOMETRY FOR A REAL TIME SYSTEM," filed Jan. 4, 2019, assigned to the assignee hereof, and expressly incorporated herein by reference in its entirety.

1. TECHNICAL FIELD

Aspects of this disclosure relate generally to autonomous or semi-autonomous driving techniques, and more specifically, to hybrid lane estimation using both deep learning (DL) and computer vision (CV).

2. BACKGROUND

Modern motor vehicles are increasingly incorporating technology that helps drivers avoid drifting into adjacent lanes or making unsafe lane changes (e.g., lane departure warning (LDW)), or that warns drivers of other vehicles behind them when they are backing up, or that brakes automatically if a vehicle ahead of them stops or slows suddenly (e.g., forward collision warning (FCW)), among other things. The continuing evolution of automotive technology aims to deliver even greater safety benefits, and ultimately deliver automated driving systems (ADS) that can handle the entire task of driving without the need for user intervention.

There are six levels that have been defined to achieve full automation. At Level 0, the human driver does all the driving. At Level 1, an advanced driver assistance system (ADAS) on the vehicle can sometimes assist the human driver with either steering or braking/accelerating, but not both simultaneously. At Level 2, an ADAS on the vehicle can itself actually control both steering and braking/accelerating simultaneously under some circumstances. The human driver must continue to pay full attention at all times and perform the remainder of the driving tasks. At Level 3, an ADS on the vehicle can itself perform all aspects of the driving task under some circumstances. In those circumstances, the human driver must be ready to take back control at any time when the ADS requests the human driver to do so. In all other circumstances, the human driver performs the driving task. At Level 4, an ADS on the vehicle can itself perform all driving tasks and monitor the driving environment, essentially doing all of the driving, in certain circumstances. The human need not pay attention in those circumstances. At Level 5, an ADS on the vehicle can do all the driving in all circumstances. The human occupants are just passengers and need never be involved in driving.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of lane estimation includes receiving a plurality of camera frames captured by a camera sensor of a vehicle, assigning a first subset of the plurality of camera frames to a deep learning (DL) lane detector and a second subset of the plurality of camera frames to a computer vision (CV) lane detector based on availability of the DL detector and the CV detector, identifying a first set of lane boundary lines in a first camera frame processed by the DL detector, identifying a second set of lane boundary lines in a second camera frame processed by the CV detector, generating a first set of lane models based on the first set of lane boundary lines, generating a second set of lane models based on the second set of lane boundary lines, and updating a set of previously identified lane models based on the first set of lane models and/or the second set of lane models.

In an aspect, an apparatus for lane estimation includes a memory and at least one processor coupled to the memory, wherein the at least one processor is configured to receive a plurality of camera frames captured by a camera sensor of a vehicle, assign a first subset of the plurality of camera frames to a DL detector and a second subset of the plurality of camera frames to a CV detector based on availability of the DL detector and the CV detector, identify a first set of lane boundary lines in a first camera frame processed by the DL detector, identify a second set of lane boundary lines in a second camera frame processed by the CV detector, generate a first set of lane models based on the first set of lane boundary lines, generate a second set of lane models based on the second set of lane boundary lines, and update a set of previously identified lane models based on the first set of lane models and/or the second set of lane models.

In an aspect, an apparatus for lane estimation includes means for receiving a plurality of camera frames captured by a camera sensor of a vehicle, means for assigning a first subset of the plurality of camera frames to a DL detector and a second subset of the plurality of camera frames to a CV detector based on availability of the DL detector and the CV detector, means for identifying a first set of lane boundary lines in a first camera frame processed by the DL detector, means for identifying a second set of lane boundary lines in a second camera frame processed by the CV detector, means for generating a first set of lane models based on the first set of lane boundary lines, means for generating a second set of lane models based on the second set of lane boundary lines, and means for updating a set of previously identified lane models based on the first set of lane models and/or the second set of lane models.

In an aspect, a non-transitory computer-readable medium storing computer-executable instructions includes computer-executable instructions comprising at least one instruction instructing at least one processor to receive a plurality of camera frames captured by a camera sensor of a vehicle, at least one instruction instructing the at least one processor to assign a first subset of the plurality of camera frames to a DL detector and a second subset of the plurality of camera frames to a CV detector based on availability of the DL detector and the CV detector, at least one instruction instructing the at least one processor to identify a first set of lane boundary lines in a first camera frame processed by the DL detector, at least one instruction instructing the at least one processor to identify a second set of lane boundary lines in a second camera frame processed by the CV detector, at least one instruction instructing the at least one processor to generate a first set of lane models based on the first set of lane boundary lines, at least one instruction instructing the at least one processor to generate a second set of lane models based on the second set of lane boundary lines, and at least one instruction instructing the at least one processor to update a set of previously identified lane models based on the first set of lane models and/or the second set of lane models.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
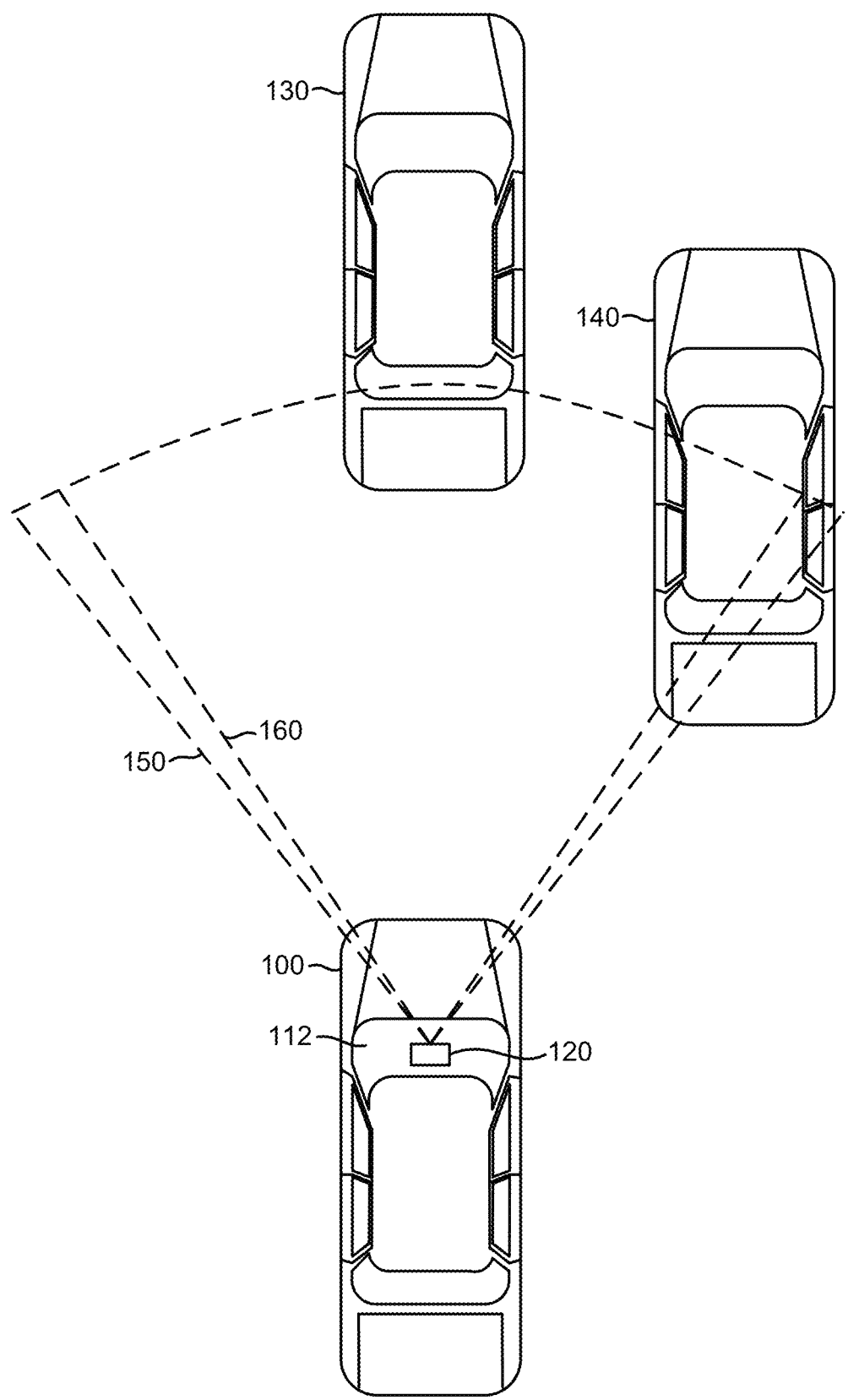
FIG. 1 is a top view of a vehicle employing an integrated radar-camera sensor behind the windshield, according to various aspects of the disclosure.

Aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. In addition, for each of the aspects described herein, the corresponding form of any such aspect may be implemented as, for example, "logic configured to" perform the described action.

Autonomous and semi-autonomous driving safety technologies use a combination of hardware (sensors, cameras, and radar) and software to help vehicles identify certain safety risks so they can warn the driver to act (in the case of an ADAS), or act themselves (in the case of an ADS), to avoid a crash. A vehicle outfitted with an ADAS or ADS includes one or more camera sensors mounted on the vehicle that capture images of the scene in front of the vehicle, and also possibly behind and to the sides of the vehicle. Radar systems may also be used to detect objects along the road of travel, and also possibly behind and to the sides of the vehicle. Radar systems utilize radio frequency (RF) waves to determine the range, direction, speed, and/or altitude of the objects along the road. More specifically, a transmitter transmits pulses of RF waves that bounce off any object(s) in their path. The pulses reflected off the object(s) return a small part of the RF waves' energy to a receiver, which is typically located at the same location as the transmitter. The camera and radar are typically oriented to capture their respective versions of the same scene.

A processor, such as a digital signal processor (DSP), within the vehicle analyzes the captured camera images and radar frames and attempts to identify objects within the captured scene. Such objects may be other vehicles, pedestrians, road signs, objects within the road of travel, etc. The radar system provides reasonably accurate measurements of object distance and velocity in various weather conditions. However, radar systems typically have insufficient resolution to identify features of the detected objects. Camera sensors, however, typically do provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

To further enhance ADAS and ADS systems, especially at Level 3 and beyond, autonomous and semi-autonomous vehicles may utilize high definition (HD) map datasets, which contain significantly more detailed information and true-ground-absolute accuracy than those found in current conventional resources. Such HD maps may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by autonomous/semi-autonomous vehicles. HD maps may also provide electronic horizon predictive awareness, which enables autonomous/semi-autonomous vehicles to know what lies ahead.

Referring now to FIG. 1, a vehicle 100 (referred to as an "ego vehicle" or a "host vehicle") is illustrated that includes a radar-camera sensor module 120 located in the interior compartment of the vehicle 100 behind the windshield 112. The radar-camera sensor module 120 includes a radar component configured to transmit radar signals through the windshield 112 in a horizontal coverage zone 150 (shown by dashed lines), and receive reflected radar signals that are reflected off of any objects within the coverage zone 150. The radar-camera sensor module 120 further includes a camera component for capturing images based on light waves that are seen and captured through the windshield 112 in a horizontal coverage zone 160 (shown by dashed lines).

Although FIG. 1 illustrates an example in which the radar component and the camera component are collocated components in a shared housing, as will be appreciated, they may be separately housed in different locations within the vehicle 100. For example, the camera may be located as shown in FIG. 1, and the radar component may be located in the grill or front bumper of the vehicle 100. Additionally, although FIG. 1 illustrates the radar-camera sensor module 120 located behind the windshield 112, it may instead be located in a rooftop sensor array, or elsewhere. Further, although FIG. 1 illustrates only a single radar-camera sensor module 120, as will be appreciated, the vehicle 100 may have multiple radar-camera sensor modules 120 pointed in different directions (to the sides, the front, the rear, etc.). The various radar-camera sensor modules 120 may be under the "skin" of the vehicle (e.g., behind the windshield 112, door panels, bumpers, grills, etc.) or within a rooftop sensor array.

The radar-camera sensor module 120 may detect one or more (or none) objects relative to the vehicle 100. In the example of FIG. 1, there are two objects, vehicles 130 and 140, within the horizontal coverage zones 150 and 160 that the radar-camera sensor module 120 can detect. The radar-camera sensor module 120 may estimate parameters (attributes) of the detected object(s), such as the position, range, direction, speed, size, classification (e.g., vehicle, pedestrian, road sign, etc.), and the like. The radar-camera sensor module 120 may be employed onboard the vehicle 100 for automotive safety applications, such as adaptive cruise control (ACC), forward collision warning (FCW), collision mitigation or avoidance via autonomous braking, lane departure warning (LDW), and the like.

Collocating the camera and radar permits these components to share electronics and signal processing, and in particular, enables early radar-camera data fusion. For example, the radar sensor and camera may be integrated onto a single board. A joint radar-camera alignment technique may be employed to align both the radar sensor and the camera. However, collocation of the radar sensor and camera is not required to practice the techniques described herein.

Figure 2:
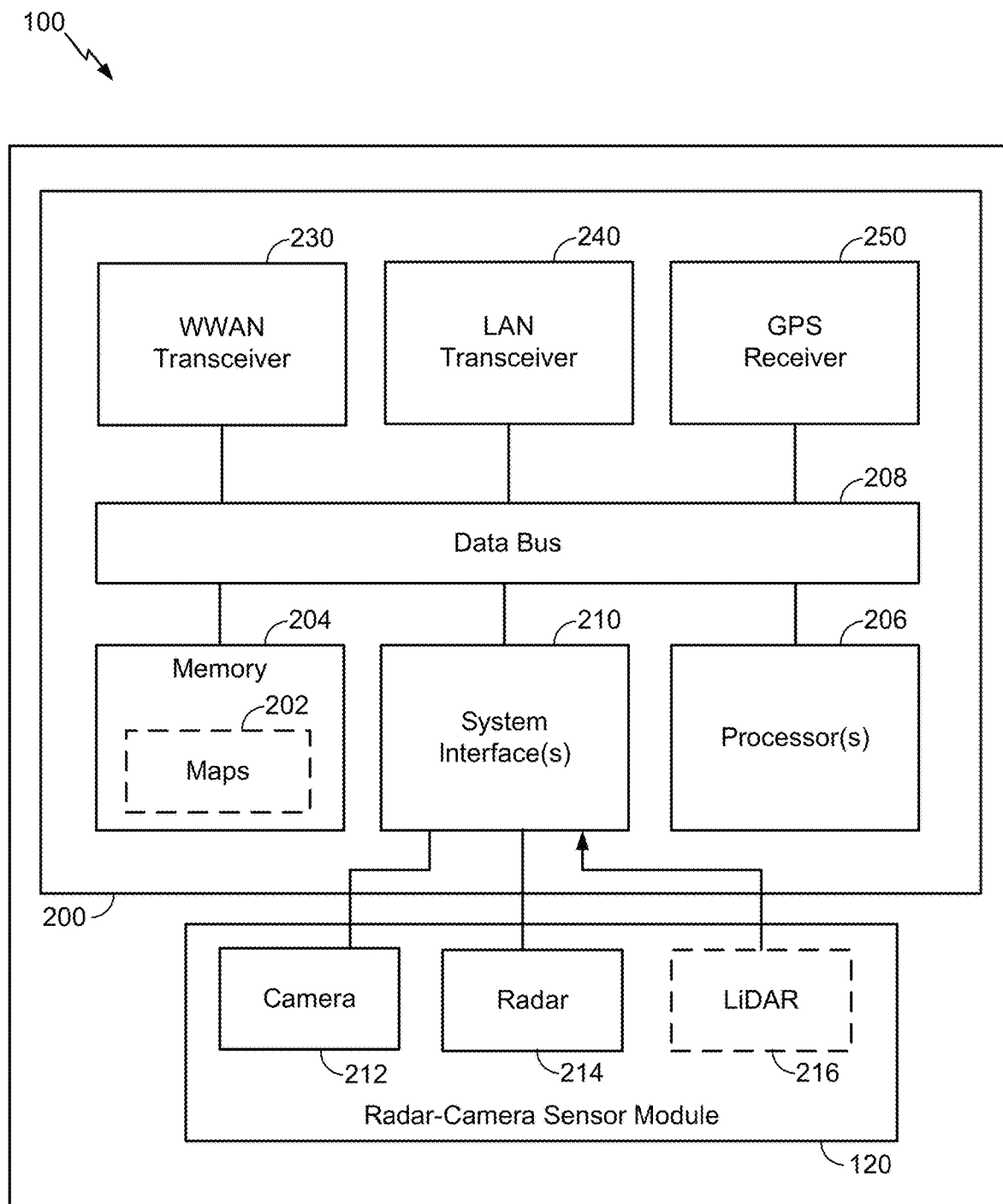
FIG. 2 illustrates an on-board computer architecture, according to various aspects of the disclosure.

FIG. 2 illustrates an on-board computer (OBC) 200 of a vehicle 100, according to various aspects of the disclosure. In an aspect, the OBC 200 may be part of an ADAS or ADS. The OBC 200 includes a non-transitory computer-readable storage medium, i.e., memory 204, and one or more processors 206 in communication with the memory 204 via a data bus 208. The memory 204 includes one or more storage modules storing computer-readable instructions executable by the processor(s) 206 to perform the functions of the OBC 200 described herein. For example, the processor(s) 206 in conjunction with the memory 204 may implement the various neural network architectures described herein.

One or more radar-camera sensor modules 120 are coupled to the OBC 200 (only one is shown in FIG. 2 for simplicity). In some aspects, the radar-camera sensor module 120 includes at least one camera 212, at least one radar 214, and an optional light detection and ranging (LiDAR) sensor 216. The OBC 200 also includes one or more system interfaces 220 connecting the processor(s) 206, by way of the data bus 208, to the radar-camera sensor module 120 and, optionally, other vehicle sub-systems (not shown).

The OBC 200 also includes, at least in some cases, a wireless wide area network (WWAN) transceiver 230 configured to communicate via one or more wireless communication networks (not shown), such as an NR network, an LTE network, a GSM network, and/or the like. The WWAN transceiver 230 may be connected to one or more antennas (not shown) for communicating with other network nodes, such as other vehicle UEs, pedestrian UEs, infrastructure access points, roadside units (RSUs), base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceiver 230 may be variously configured for transmitting and encoding signals (e.g., messages, indications, information, and so on), and, conversely, for receiving and decoding signals (e.g., messages, indications, information, pilots, and so on) in accordance with the designated RAT.

The OBC 200 also includes, at least in some cases, a wireless local area network (WLAN) transceiver 240. The WLAN transceiver 240 may be connected to one or more antennas (not shown) for communicating with other network nodes, such as other vehicle UEs, pedestrian UEs, infrastructure access points, RSUs, etc., via at least one designated RAT (e.g., cellular vehicle-to-everything (C-V2X), IEEE 802.11p (also known as wireless access for vehicular environments (WAVE)), dedicated short-range communication (DSRC), etc.) over a wireless communication medium of interest. The WLAN transceiver 240 may be variously configured for transmitting and encoding signals (e.g., messages, indications, information, and so on), and, conversely, for receiving and decoding signals (e.g., messages, indications, information, pilots, and so on) in accordance with the designated RAT.

As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing).

The OBC 200 also includes, at least in some cases, a global positioning systems (GPS) receiver 250. The GPS receiver 250 may be connected to one or more antennas (not shown) for receiving satellite signals. The GPS receiver 250 may comprise any suitable hardware and/or software for receiving and processing GPS signals. The GPS receiver 250 requests information and operations as appropriate from the other systems, and performs the calculations necessary to determine the vehicle's 100 position using measurements obtained by any suitable GPS algorithm.

In an aspect, the OBC 200 may utilize the WWAN transceiver 230 and/or the WLAN transceiver 240 to download one or more maps 202 that can then be stored in memory 204 and used for vehicle navigation. Map(s) 202 may be one or more high definition (HD) maps, which may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by vehicle 100. Map(s) 202 may also provide electronic horizon predictive awareness, which enables the vehicle 100 to know what lies ahead.

In an aspect, the camera 212 may capture image frames (also referred to herein as camera frames) of the scene within the viewing area of the camera 212 (as illustrated in FIG. 1 as horizontal coverage zone 160) at some periodic rate. Likewise, the radar 214 may capture radar frames of the scene within the viewing area of the radar 214 (as illustrated in FIG. 1 as horizontal coverage zone 150) at some periodic rate. The periodic rates at which the camera 212 and the radar 214 capture their respective frames may be the same or different. Each camera and radar frame may be time-stamped. Thus, where the periodic rates are different, the timestamps can be used to select simultaneously, or nearly simultaneously, captured camera and radar frames for further processing (e.g., fusion).

Figure 3:
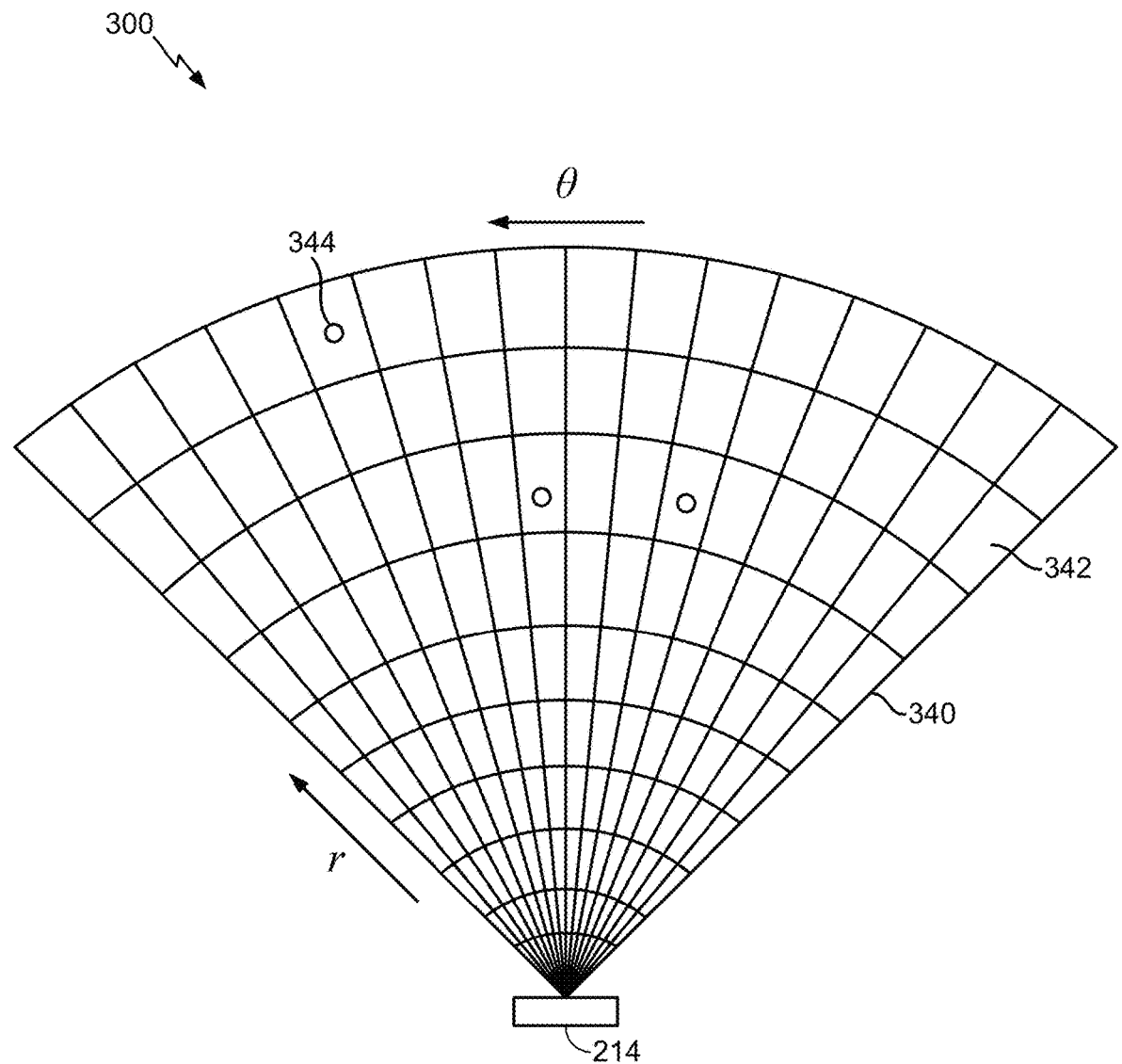
FIG. 3 is a schematic of a sensed observation radar grid, according to various aspects of the disclosure.

FIG. 3 illustrates a sensed observation radar grid 300. A transmitter (e.g., an array of transmit antennas) of the radar 214 transmits pulses of electromagnetic RF waves that reflect from object(s) in the transmission path, such as vehicles 130 and 140 in FIG. 1. A portion of the electromagnetic RF waves that are reflected from the object(s) are returned to the receiver (e.g., an array of receive antennas) of the radar 214, which is usually located at the same site as the transmitter of the radar 214.

In an aspect, the radar 214 may be an imaging radar that uses beamforming to scan horizontally and vertically. Beamforming is a technique used to aim the effective direction of a radar beam by changing the delay between different transmitting antennas so that the signals add constructively in a specified direction. Thus, the radar 214 may scan horizontally and vertically across the sensing area (e.g., horizontal coverage zone 150) by using a transmitter comprising an array of electronically steered antennas.

The returned responses (which may also be referred to as "pings") measured by the radar 214 is characterized as an observation (or occupancy) grid 340 having a plurality of observation cells 342. Each cell 342 represents the measured returned response value at a specific range (r) and angle/azimuth (θ). Each cell 342 is alternately referred to as a range-angle bin. Features 344 are extracted from the cells 342 to determine whether the feature 344 is an object (e.g., a vehicle 130/140). Each feature 344 within a respective cell 342 can be identified as having up to four parameters: range, Doppler, azimuth, and elevation. This is called a radar frame. As an example, a feature 344 within a cell 342 may be the signal-to-noise ratio (SNR) computed by a constant false alarm rate (CFAR) algorithm. However, it should be understood that other methods may be used to target and identify features 344 within a cell 342.

The processor(s) 206 generate four dimensional (4D) tensors for features 344 within cells 342 of the observation grid 340 detected by the radar 214. The generated tensors represent the range (distance from the vehicle 100 to the detected feature 344), azimuth (the horizontal distance between a feature 344 and a reference RF ray emitted by the radar 214, such as the initial RF ray of a radar sweep), Doppler (indicating the speed of the detected feature 344), and elevation (vertical direction from the radar 214 to the detected feature) of each detected feature 344. The processor(s) 206 then performs object detection, object classification, localization, and property/attribute estimation based on the tensors and undistorted camera frames received from the camera 212.

In contrast to images (e.g., from camera 212), radar signals (e.g., from radar 214) have several unique characteristics. One is specular reflections, in which only certain surfaces on the target having an advantageous orientation reflect the radar signal, which often results in a small number of reflections. A second is non-uniformity, in which objects that appear at the far range of the {range, azimuth} signal space are always smaller and have a different shape than those that appear at closer ranges. This is not the case with camera images.

Figure 4:
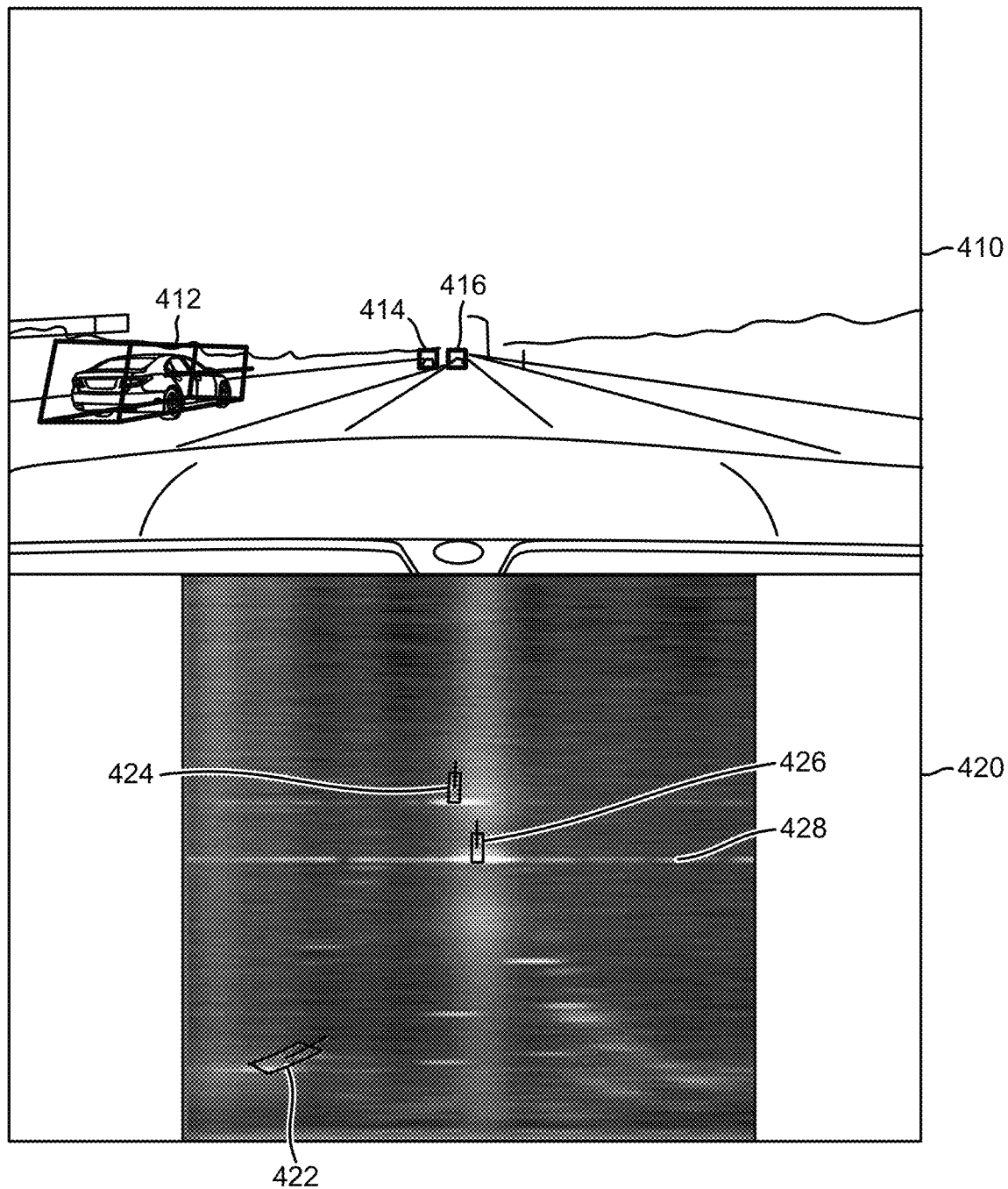
FIG. 4 illustrates a comparison between an exemplary camera frame and exemplary radar frame, according to various aspects of the disclosure.

FIG. 4 illustrates exemplary differences between a camera image 410 and a radar image 420 of the same scene. The camera image 410 may have been captured by the camera 212, and the radar image 420 may have been captured by the radar 214. The camera 212 captures raw camera frames of the scene within the viewing area of the camera 212 (as illustrated in FIG. 1 as horizontal coverage zone 160). The processor(s) 206 correct any distortion in the raw camera frames to generate undistorted camera frames that are used for processing with the radar tensors. The camera image 410 is an example of an undistorted camera frame. Note that the terms "frame" and "image" are used interchangeably herein.

The radar image 420 is captured and processed as discussed above with respect to FIG. 3. The camera image 410 and the radar image 420 are then processed to identify objects within the respective images. Object detection in radar images was discussed above with respect to FIG. 3. Object detection in camera images is well-known in the art and is therefore not further described here for the sake of brevity. Any object detection methods and/or techniques may be used to detect objects in the camera images.

The results of the object detection are various attributes of the detected object(s), including bounding boxes in Cartesian x-y(-z) coordinates that tightly enclose the object(s). In the camera image 410, three objects have been detected, each surrounded by a bounding box 412, 414, and 416. In the radar image 420, the same three objects have been detected and are surrounded by bounding boxes 422, 424, and 426. As can be seen in FIG. 4, the shapes of the objects/bounding boxes 422, 424, and 426 in the radar image 420 are different sizes and shapes based on whether or not they are below (i.e., bounding box 422) or above (i.e., bounding boxes 424 and 426) the midline 428 of radar image 420. In addition, the bounding boxes associated with the closer objects (e.g., bounding box 422) are larger than the bounding boxes associated with farther objects (e.g., bounding boxes 424 and 426) due to reception at the radar 214 of fewer reflected radio waves due to the greater distance between the radar 214 and the further objects.

Once one or more objects (or none) have been identified in the camera image 410, the processor(s) 206 may use pattern-recognition and/or object recognition algorithms to determine the classification (another attribute) of the object(s) as road signs, traffic barrels, cars, trucks, motorcycles, bicyclists, and pedestrians. The fine pixel resolution of an image enables precise angular localization of recognized objects. Range (another attribute of the object) may be estimated from stereo disparity if two cameras are used. Otherwise, a monocular system can estimate range from expected object size or displacement from the horizon. Object classification for radar images is more difficult, and often relies on correlating the object(s) detected in the radar image (e.g., radar image 420) to the object(s) detected in the corresponding (i.e., simultaneously, or nearly simultaneously, captured) camera image (e.g., camera image 410).

More specifically, the radar 214 provides reasonably accurate measurements of object distance and velocity in various weather conditions. However, radar systems typically have insufficient resolution to identify features of the detected objects. The camera 212, however, may provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

Further, recent advances in machine-learning techniques have made object-classification systems for both camera images and radar images much more effective. For example, deep neural networks (mathematical functions with many layers of nodes that resemble the connectivity of brain neurons) are now practical to train due to recently developed algorithms and the availability of "big data" image sets. The heavy mathematics can now be applied to every pixel in a video/radar stream in real time due to miniature supercomputers comprised of inexpensive graphics processing units (GPUs).

Figure 5:
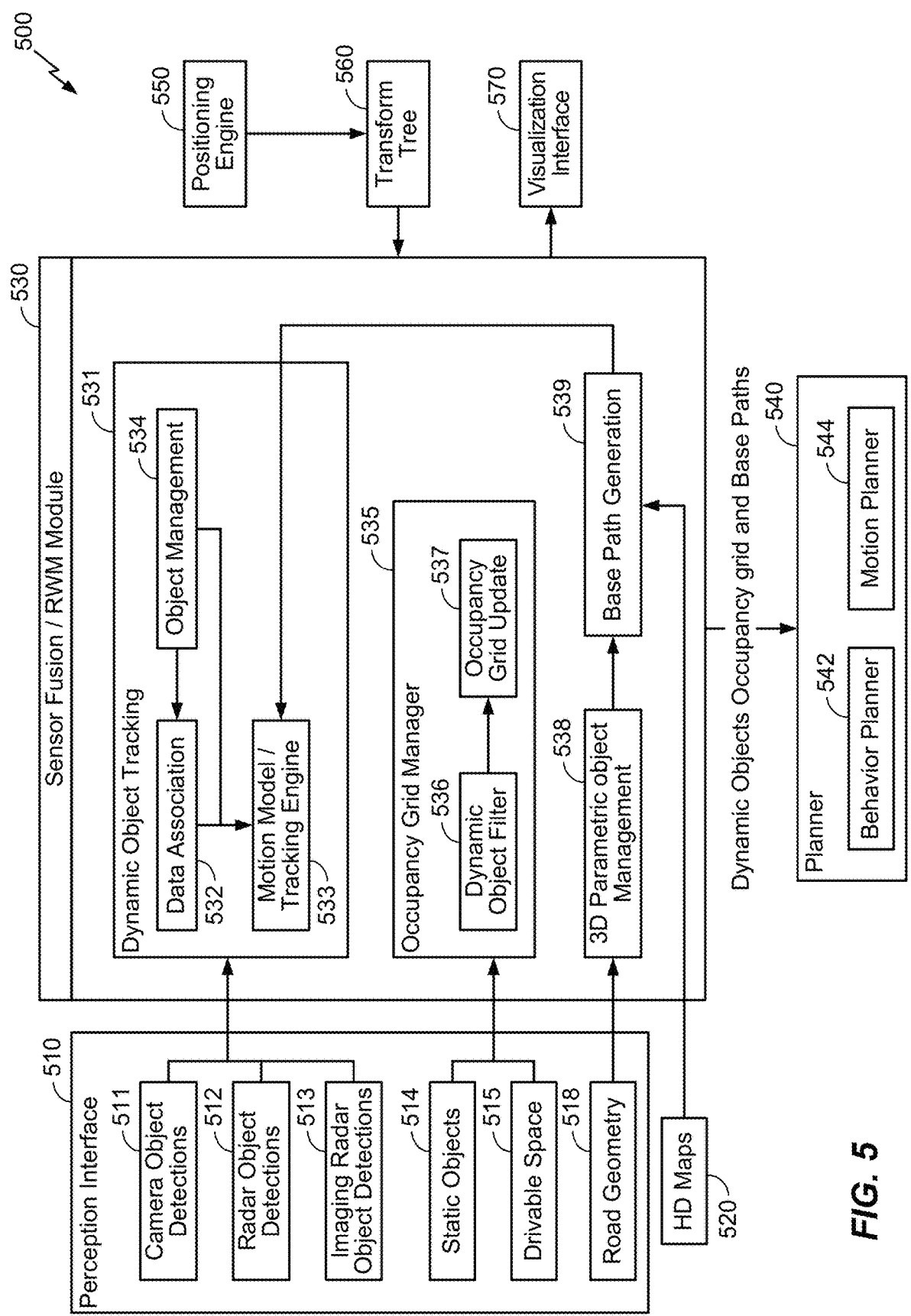
FIG. 5 illustrates an exemplary sensor fusion architecture, according to aspects of the disclosure.

FIG. 5 illustrates an exemplary sensor fusion architecture 500, according to aspects of the disclosure. In an aspect, the sensor fusion architecture 500 may be implemented by the radar-camera sensor module 120 and/or the OBC 200 of FIG. 2. A perception interface 510 of the sensor fusion architecture 500 provides inputs to a sensor fusion/real world model (RWM) module 530. In the example of FIG. 5, the perception interface 510 includes a camera object detection module 511 (which detects objects in the images captured by the camera 212), an optional radar object detection module 512 (which detects objects based on data from the optional LiDAR sensor 216), and an imaging radar object detection module 513 (which detects objects based on data from the radar 214). In order to reduce the data transfer budget, the camera object detection module 511 extracts the geometric and semantic information from the camera images and sends it to the sensor fusion/RWM module 530 without the camera images themselves. The perception interface 510 also includes information about static objects 514, drivable space 516, and road geometry 518 (obtained from the HD map(s) 520). The information about static objects 514 may be bounding box information, the same as for vehicles. Information about drivable space 516 may include a per pixel label indicating whether that pixel is drivable or not. The information about road geometry 518 may be a spline representation of the lane boundaries. The HD map(s) 520 for the region of travel (e.g., continental United States, North America, Europe, etc.) may be either pre-loaded or downloaded as needed.

In the example of FIG. 5, the sensor fusion/RWM module 530 of the sensor fusion architecture 500 includes a dynamic object tracking module 531 that includes a data association module 532, a motion model/tracking engine 533, and an object management module 534. The data association module 532 identifies which target object(s) in previous camera/radar frames are matched to currently detected object(s) and associates them with each other across the camera/radar frames. The dynamic object tracking module 531 receives the object detections from the camera object detection module 511, the optional radar object detection module 512, and the imaging radar object detection module 513 and generates dynamic object detections (e.g., detections of moving objects, including their path, speed, rotation, etc.). The sensor fusion/RWM module 530 also includes an occupancy grid manager module 535 that includes a dynamic object filter module 536 and an occupancy grid update module 537. The occupancy grid manager module 535 receives the information about the static objects 514 and the drivable space 516 from the perception interface 510 and the occupancy grid update module 537 updates the occupancy grid information (e.g., which grid boxes are occupied and which are open). Finally, the sensor fusion/RWM module 530 includes a 3D parametric object management module 538 and a base path generation module 539 that receive as input information about the road geometry 518 and HD maps 520 (e.g., map(s) 202), respectively, and outputs base paths (e.g., the center-of-the-lane path that the host vehicle and/or nearby objects are expected to follow).

The sensor fusion architecture 500 also includes a positioning engine 550 (e.g., a GPS, motion sensors (e.g., accelerometer, gyroscope, etc.), etc.) and a transform tree module 560 that provide further inputs to the sensor fusion/RWM module 530. For example, a "sensor coordinate frame" (e.g., a camera coordinate frame, a radar coordinate frame, etc.) as used herein refers to a coordinate system with an origin at the sensor's current position and orientation along the sensor's current axes.

The sensor fusion/RWM module 530 outputs the dynamic object detections, occupancy grid, and base paths to a planner module 540 of the sensor fusion architecture 500. The planner module 540 includes a behavior planner module 542 and a motion planner module 544 that direct other systems (e.g., braking, accelerations, steering, cruise control, signaling, etc.) of the host vehicle (e.g., vehicle 100 of FIGS. 1 and 2) to act (e.g., brake, accelerate, change lanes, etc.) based on the information about the dynamic objects, the occupancy grid, and the base paths received from the sensor fusion/RWM module 530. The sensor fusion/RWM module 530 also outputs to a visualization interface 570. The visualization interface 570 may be connected to a display (e.g., light emitting diode (LED) display, liquid crystal display (LCD), etc., not shown) within the host vehicle (e.g., vehicle 100), such as on the dashboard or behind the steering wheel, to provide information to a driver or occupant within the vehicle.

Although the sensor fusion architecture 500 shown in FIG. 5 is primarily directed to reacting to events (e.g., other vehicles changing lanes, turning onto the roadway, braking, etc.) that may occur while the vehicle is driving, as will be appreciated, the sensor fusion architecture 500 may also receive input from a driver of the vehicle (e.g., direction to change lanes, turn, etc.) and act on those instructions based on the information generated by the sensor fusion/RWM module 530. For example, in the case of an instruction to change lanes, the sensor fusion architecture 500 may first determine that there is a lane to change into and that there are no objects (e.g., vehicles, pedestrians, road signs, etc.) in it before the planner module 540 directs the vehicle to change lanes as instructed.

Figure 6:
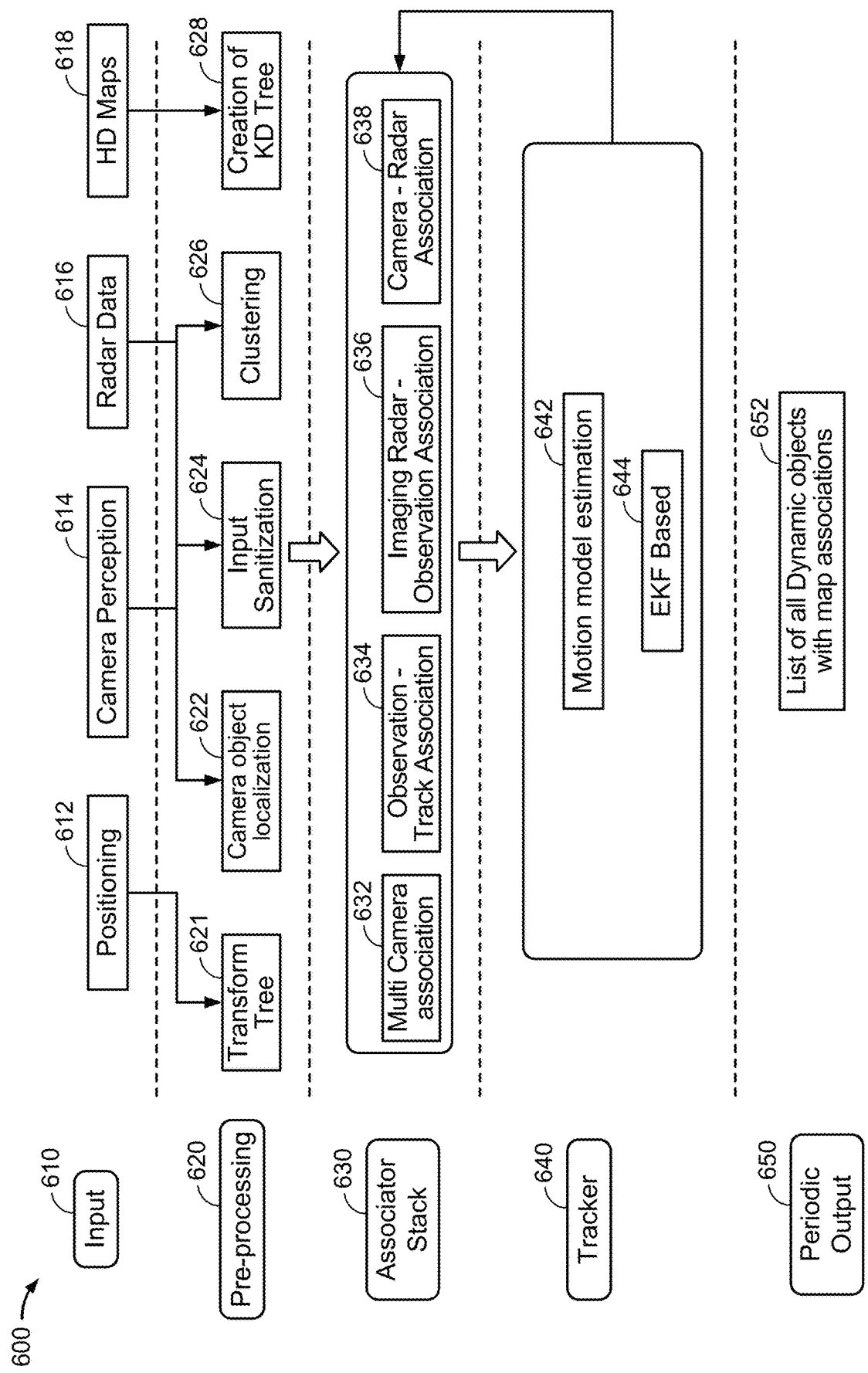
FIG. 6 illustrates an exemplary object tracking architecture, according to aspects of the disclosure.

FIG. 6 illustrates an exemplary object tracking architecture 600, according to aspects of the disclosure. In an aspect, the object tracking architecture 600 may be implemented by the radar-camera sensor module 120 and/or the OBC 200 of FIG. 2, and more specifically, the dynamic object tracking module 531 of the sensor fusion/RWM module 530 in FIG. 5. At an input stage 610, the object tracking architecture 600 receives as input positioning information 612 (e.g., GPS information), camera perception information 614 (e.g., camera images from camera 212), radar data 616 (e.g., radar frames from radar 214), and HD maps 618 (e.g., HD maps 520 of FIG. 5).

At a pre-processing stage 620, the object tracking architecture 600 creates a transform tree 621 (a binary tree representation of multiple coordinate frames as nodes, and links storing the transformation matrix to move from one coordinate frame to another) from the positioning information 612. The pre-processing stage 620 performs camera object localization 622, input sanitization 624, and clustering 626 operations on the camera perception information 614 and radar data 616. The pre-processing stage 620 uses the HD maps 618 for creation of a k-D tree 628 (a space-partitioning data structure for organizing points in a k-dimensional space).

At an associator stack stage 630 (which performs associations of new observations of target objects with existing tracks associated with those objects), the object tracking architecture 600 generates multi camera associations 632, observation track associations 634, imaging radar observation associations 636, and camera-radar associations 638. At a tracker stage 640, the object tracking architecture 600 performs motion model estimation 642 of a tracked object and an extended Kalman filter (EKF) based solution 644 (discussed further below, and referred to as an "EKF tracker"). Finally, at a periodic output stage 650, the object tracking architecture 600 outputs a list of all dynamic objects with respective map associations 652. This information is then fed to the planner module 540 in FIG. 5.

The present disclosure provides techniques for hybrid lane estimation using both DL and CV methods based on road geometry for a real time system. Lane detection algorithms based on DL and CV methods have their respective advantages and disadvantages. DL-based methods can detect long range lanes, wide range lanes, and occluded lanes. However, DL-based methods are slow, and their vertex level accuracy (i.e., the ability to identify lane vertices) is poor. CV-based methods can only detect short range lanes, narrow range lanes, and visible lanes. However, CV-based methods are fast and have good vertex level accuracy. Thus, DL-based methods are superior to CV-based methods, but are slow and have poor vertex-level accuracy.

Figure 7:
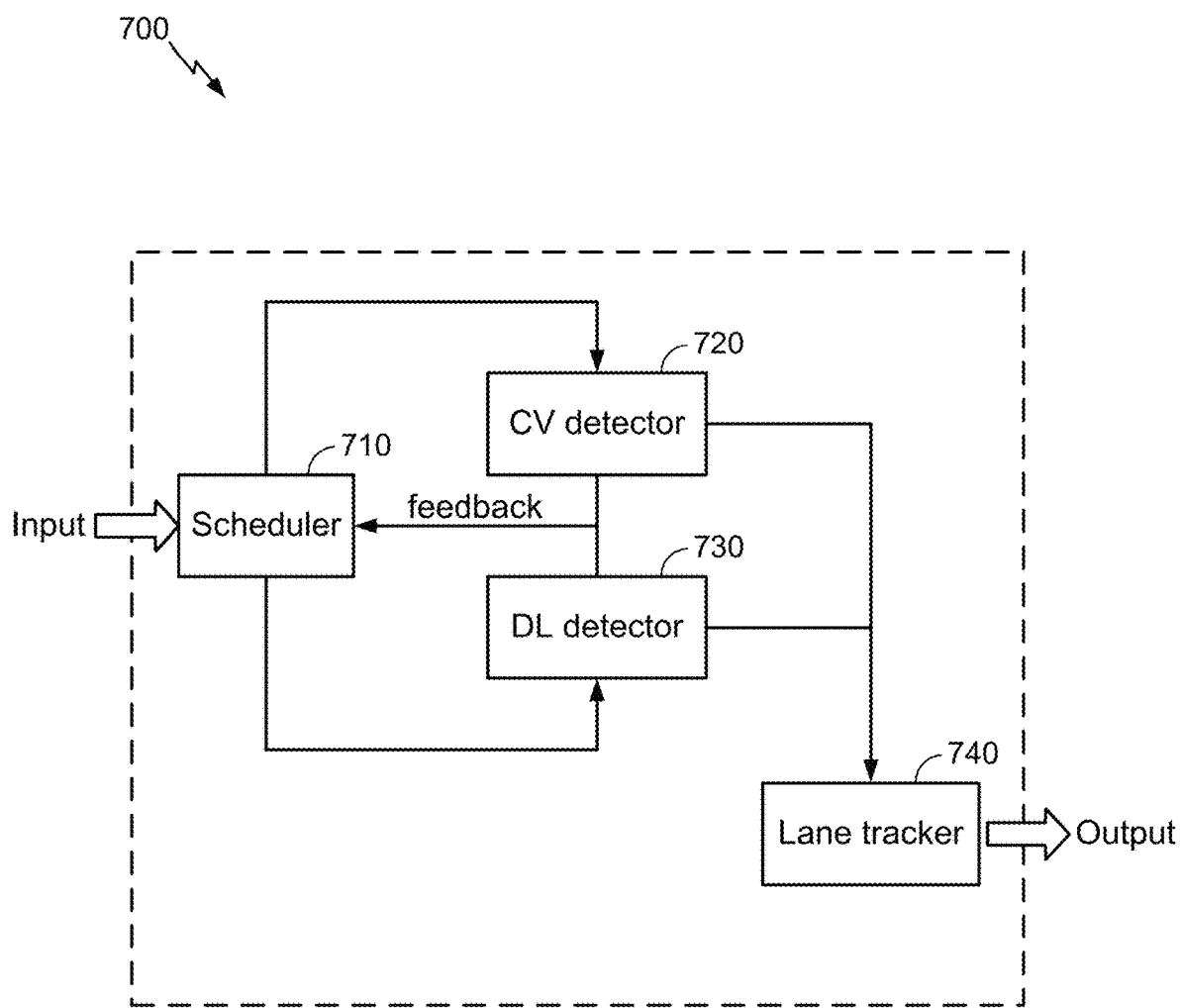
FIG. 7 illustrates an exemplary system for hybrid lane estimation using both DL and CV methods, according to aspects of the disclosure.

Accordingly, the present disclosure provides a hybrid lane estimation technique that combines both DL and CV methods to provide their mutual benefits. FIG. 7 illustrates an exemplary system 700 for hybrid lane estimation using both DL and CV methods, according to aspects of the disclosure. The system 700 may be used by the perception interface to generate the road geometry 518. A scheduler 710 receives camera frames (e.g., camera image 410) from the perception interface 510 and sends them to a CV detector 720 and a DL detector 730, depending on which is currently available. Each detector sends feedback to the scheduler 710 to inform the scheduler 710 that it is available to take more work or that it is at full capacity. Because the CV detector 720 can process camera frames faster than the DL detector 730, but the DL detector 730 provides better results (e.g., long range lane detections, wide range lane detections, and occluded lane detections), the scheduler 710 preferentially sends camera frames to the DL detector 730 until it is at full capacity, then sends camera frames to only the CV detector 720 until the DL detector is available again.

In an aspect, the scheduler 710 may assign the same camera frames to both the CV detector 720 and the DL detector 730 as much as possible. For example, if the CV detector 720 can process 100 camera frames in the time it takes the DL detector 730 to process 10 camera frames, the scheduler may send the first 10 camera frames of the 100 to both detectors and the remaining 90 to the CV detector only. As another example, the scheduler 710 may assign the first camera frame of each group of 10 camera frames to both the CV detector 720 and the DL detector 730 and the remaining nine camera frames of each group to the CV detector 720 only.

Alternatively, the scheduler 710 may assign different camera frames to the CV detector 720 and the DL detector 730. For example, the scheduler 710 may assign all incoming camera frames to the DL detector 730 until it is full, then all incoming camera frames to the CV detector 720 until the DL detector 730 is available again.

The output of the CV detector 720 and the DL detector 730 is sent to a lane tracker 740. The output/results of the CV detector 720 and the DL detector 730 are a set of lane vertices (i.e., a series of points along the detected lane boundary) in the image domain in which at least the lanes of the road on which the ego vehicle is travelling have been identified. The lanes may be identified from lane markers, such as lines, dashes, reflectors, etc. The lane tracker 740 tracks this lane information across consecutive camera frames processed by the CV detector 720 and the DL detector 730 and generates data associations for the detected lanes. That is, the data associations indicate which detected lane markers in one camera frame are for the same lane(s) as lane markers detected in a subsequent camera frame. Further, as illustrated in FIG. 8, the lane tracker 740 can recover DL-based lane detection results using CV-based lane detection results for intermediate frames before obtaining the next DL-based lane detection results.

Figure 8:
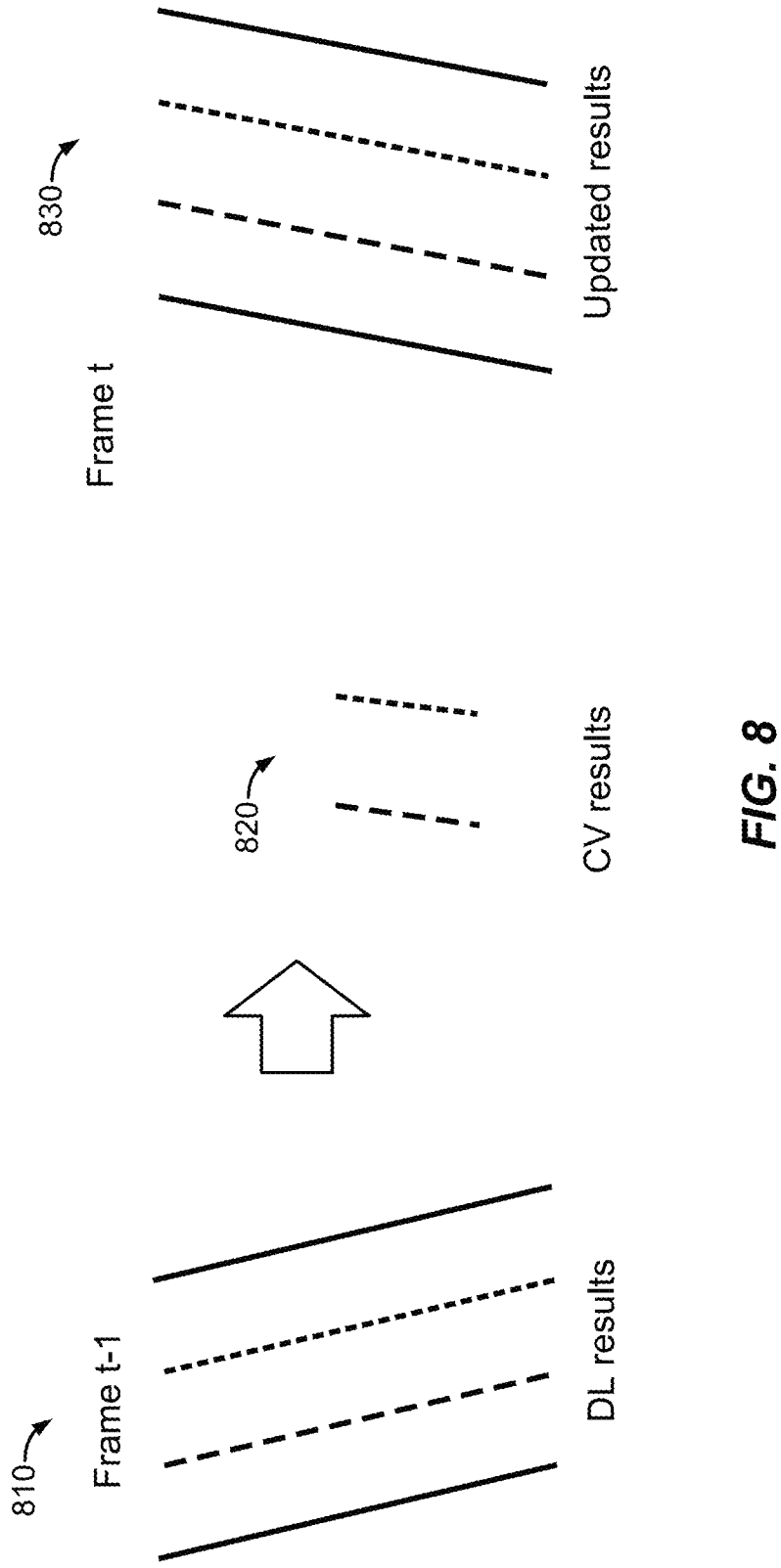
FIG. 8 illustrates an exemplary combination of DL-based lane detection results and CV-based lane detection results, according to aspects of the disclosure.

FIG. 8 illustrates an exemplary combination of DL-based lane detection results and CV-based lane detection results, according to aspects of the disclosure. As illustrated in FIG. 8, based on a camera frame captured at a time step t−1, the DL detector 730 outputs DL-based lane detection results 810, in which four lanes, represented by their center lines (referred to as "base paths"), have been detected. Also based on the same camera frame captured at time step t−1, the CV detector 720 outputs CV-based lane detection results 820, in which only two lanes, again represented by their center lines (base paths), have been detected.

In FIG. 8, the relative length and orientation of the center lines represents the relative length and orientation of the detected lanes. Thus, in the example of FIG. 8, the DL detector 730 is not only able to detect four lanes, compared to the CV detector's 720 two lanes, it can detect the lanes further down the road (as indicated by the longer lines). However, in the example of FIG. 8, the orientation of the detected lanes is incorrect, as shown when compared to the two lines representing the two lanes detected by the CV detector 720. This may have occurred because the vehicle is moving and changed position between the time the DL detector 730 began processing the camera frame and the time it output the lane detection results. Note that the position, orientation, and length of the lane detections may not actually be as different as illustrated in FIG. 8 between CV and DL frames. FIG. 8 is exaggerated to illustrate the difference between the CV and DL processes and the difference between these types of frames.

To improve the results of both the CV detector 720 and the DL detector 730, the lane tracker 740 combines the two result sets 810 and 820, as shown in FIG. 8. The combined results 830 are then passed to the remainder of the ADS/ADAS system. More specifically, the results of the DL detector 730 are considered more reliable than the results of the CV detector 720. As such, the system 700 first computes lane models (e.g., by conforming the lane vertices to a straight line or a curved line) from the results of the DL detector 730 (e.g., the frame captured at time step t−1 in the example of FIG. 8) to register them as tracking targets (i.e., tracked lane models) for tracking over time. For the subsequent frames, including the next DL detector 730 output, each tracked lane model from the previous results of the DL detector 730 is tracked (and updated as necessary) using the lane models computed from the current results of the CV detector 720 and the DL detector 730.

For matching lane models (i.e., where the lane models calculated by the CV detector 720 and the DL detector 730 match the tracked lane models calculated from the previous results of the DL detector 730), as described further below with reference to FIG. 10E, it is assumed that a CV lane model computed from the current frame (e.g., 1010E in FIG. 10E) matches a tracked lane model that is tracked until the previous frame. That is, the CV lane model is regarded as the new observation and the matched tracked lane model is updated using the CV lane model via a Kalman filter (where the lane models from the next DL detector 730 output are also used in the same way for tracked lane model updates). Assuming the road on which the ego vehicle is travelling is (locally) flat, unmatched tracked lane models are updated via homography (a type of transformation that maps straight lines onto another plane), which is computed from the differences between the matched tracked lane models before the lane models in the current frame are updated, as described further below with reference to FIG. 10G. Thus, for the subsequent frames before the next DL detector 730 output, the system can output wide-range and long-range results from the tracked lane models that have been updated by the CV detector 720 results (which are short and narrow lane models). For the results of the DL detector 730 at the next frame, the same matching procedure is applied for the tracked lane models.

Figure 9:
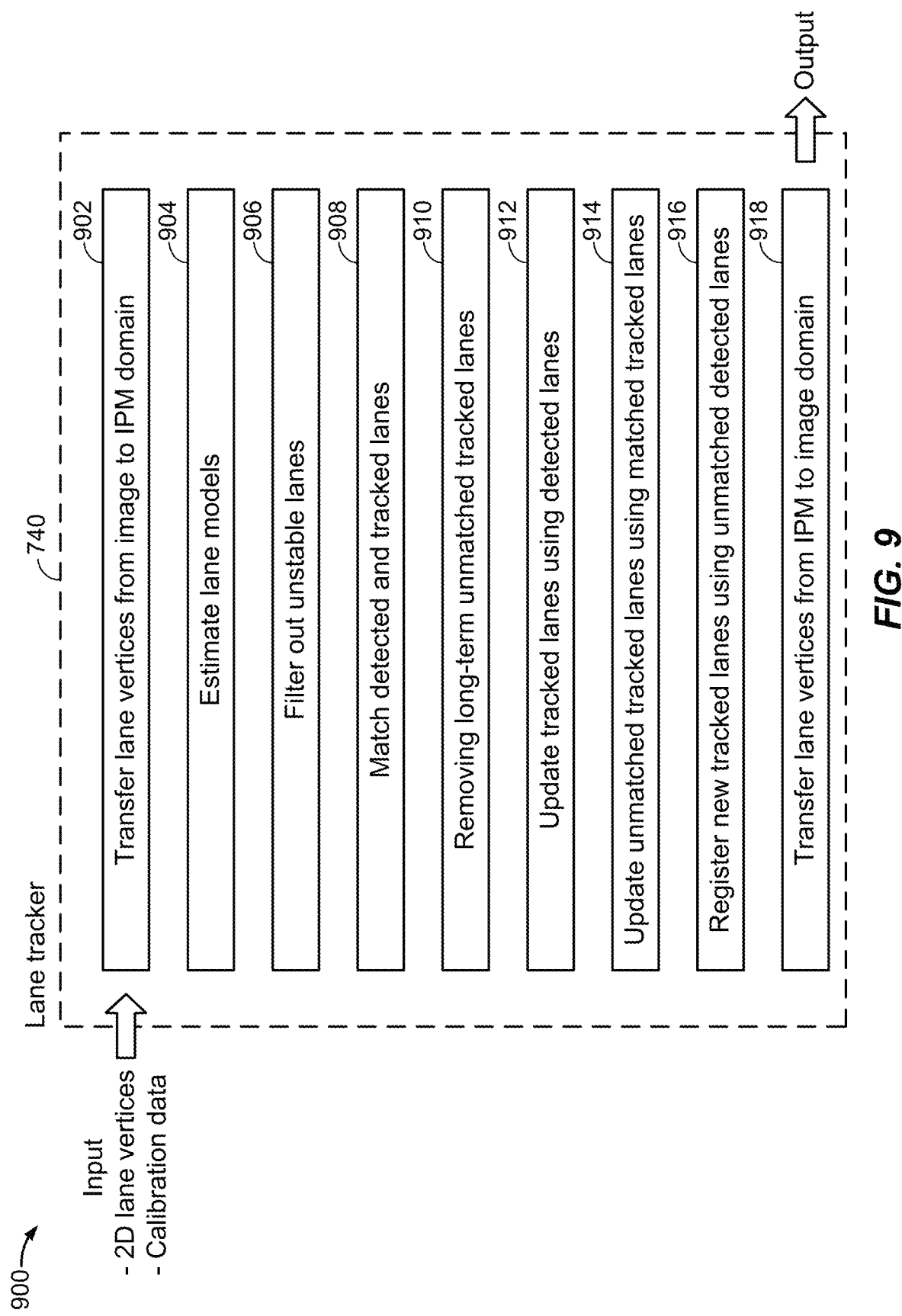
FIG. 9 illustrates an exemplary method performed by the lane tracker, according to aspects of the disclosure.

FIG. 9 illustrates an exemplary method 900 performed by the lane tracker 740, according to aspects of the disclosure. The lane tracker 740 receives as input a camera frame, lane detection results from either or both of the CV detector 720 and the DL detector 730, and camera calibration data. The lane detection results may be vertices, or points, representing the lane boundary lines detected by the CV detector 720 and/or the DL detector 730. At 902, the lane tracker 940 transfers the lane vertices (or points) of the detected lane boundary lines from the perspective of the received camera frame to the inverse perspective mapping (IPM) domain. The image domain to IPM domain transformation is computed using the camera calibration data or additional online calibration schemes. More specifically, camera parameters (e.g., pan, tilt of camera from road surface, etc.) are generally assumed to be fixed. However, these parameters can change continuously based on, for example, the condition of the road surface or the looseness of the camera fixture. There are algorithms to estimate calibration parameters available on the Internet, with assumption that the camera parameter can be changed.

Figure 10A:
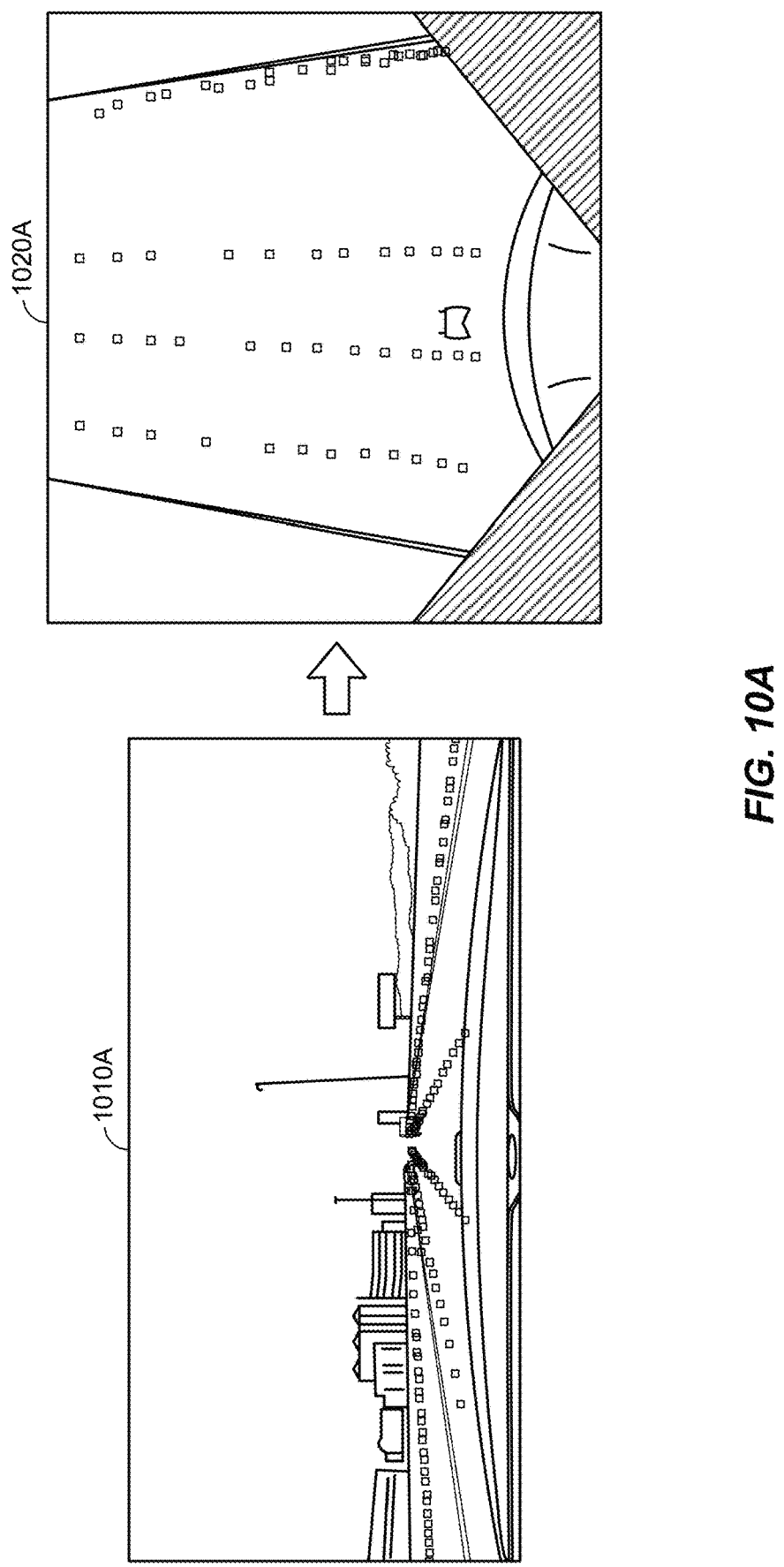
FIGS. 10A-H illustrate exemplary image frames being processed according to the techniques described herein.

With continued reference 902 of FIG. 9, to FIG. 10A, the lane tracker 740 receives a camera frame 1010A and detection results (i.e., series' of points representing lane boundary lines) from either or both of the CV detector 720 and the DL detector 730 in which the detected lanes have been identified by series' of (square) points (or vertices) along the boundaries of the lanes. The lane tracker 740 then performs an IPM function on the camera frame 1010A (and the points on the camera frame representing the detected lanes) to generate a corresponding IPM frame 1020A with corresponding points on the IPM frame that, again, identify the detected lanes by series' of points along the boundaries of the lanes. Note that the IPM frame 1020A may not be generated if only geometrical parameters (e.g., a homography matrix or an affine matrix, etc.) are needed for lane model matching and updating and there is no need to use the image on IPM domain.

Figure 10B:
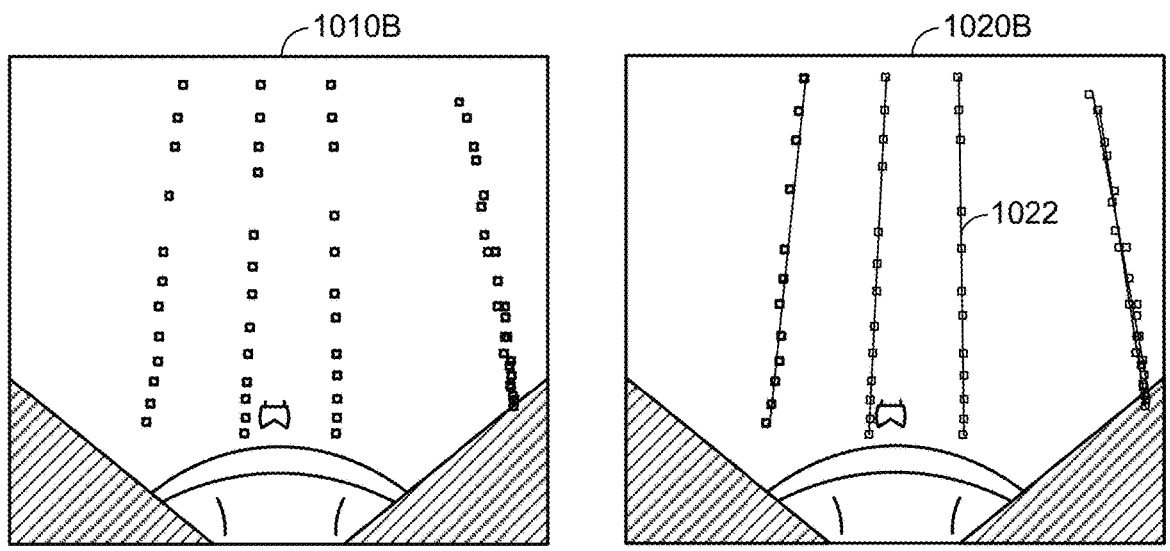

At 904, the lane tracker 740 estimates, or generates, one lane model per detected lane boundary line based on the lane vertices in the IPM frame 1020A. Thus, the set of lane models corresponding to a camera frame may be referred to as being generated based on the set of lane boundary lines detected in that camera frame. More specifically, as illustrated in FIG. 10B, the lane tracker 740 analyzes the series' of points representing the detected lane boundary lines in the IPM frame 1010B (which may correspond to the IPM frame 1020A) to determine whether they form a straight line or a curved line. Based on this analysis, the lane tracker 740 overlays lines or curves on the series' of points of the detected lanes, as shown in frame 1020B. In the example of FIG. 10B, the lines/lanes are straight, but as will be appreciated, this will not always be the case. These lines, one of which is indicated by reference number 1022, are referred to as lane models and tracking targets.

Figure 10C:
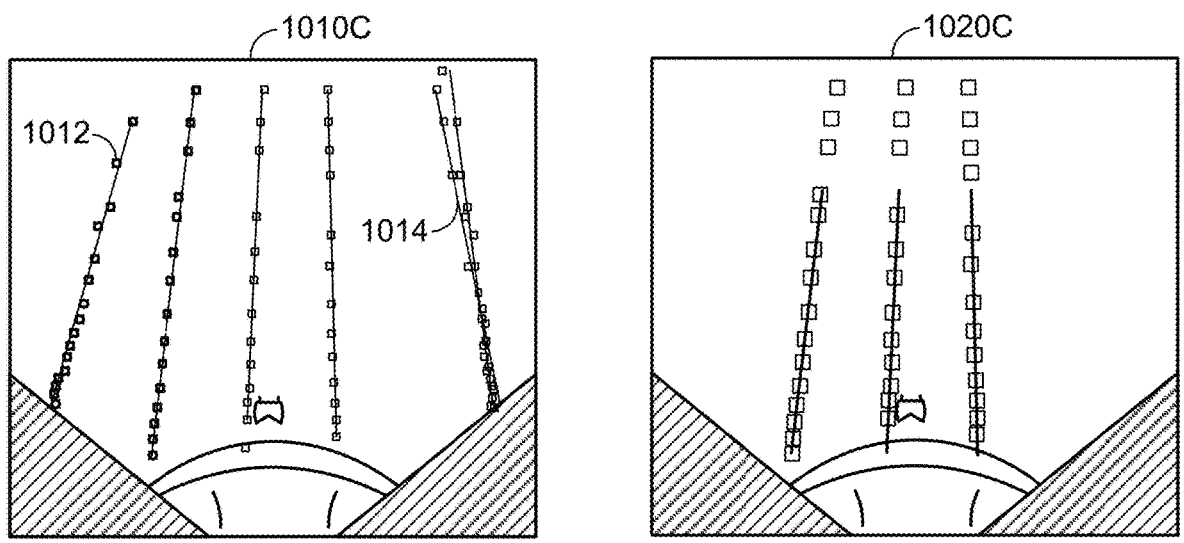

At 906, the lane tracker 740 filters out unstable lane models from the set of lane models generated from the lane boundary lines detected in the camera frame. Specifically, the lane tracker 940 removes lane models generated at 904 that have an average line-to-points distance or curve-to-points distance that is greater than a threshold. That is, if enough points of the series of points along a lane boundary line are greater than a threshold distance from the straight or curved lane boundary line, that lane model is considered unstable and is removed. The lane tracker 940 also removes any lane models that have a slope greater than a threshold (e.g., beyond the amount the lane could actually be curved, or beyond what the lane should curve given the curve of adjacent lanes). Finally, the lane tracker 740 filters out any x-directionally far lane models (e.g., lane boundary lines too far too the left or right (the x-axis) to actually be lane boundaries). Thus, as illustrated in FIG. 10C, the outermost lane models/lane boundary lines in frame 1010C are filtered out, the leftmost lane model 1012 because its slope is greater than a threshold, the rightmost lane model 1014 because its average line-to-points distance is greater than a threshold, resulting in frame 1020C. Note that although two lines are shown for lane model 1014, this is not because there are two lane models, but rather, to illustrate that the lane vertices do not conform to a single line.

At 908, the lane tracker 740 matches the remaining (stable) lane models generated from the lane boundary lines detected by the CV detector 720 or the DL detector 730 in the current camera frame to tracked lanes models that have been tracked up to the previous camera frame. Previous operations of method 900 were performed on camera frames from both the CV detector 720 and the DL detector 730, whereas subsequent operations of method 900 are performed on sequences of camera frames from both detectors that were captured at substantially the same time (e.g., within a few time steps t of each other, where t is the periodicity at which the camera sensor captures frames). Specifically, the lane tracker 740 determines the near point distance and slope difference of the lane camera in a sequence of frames from the CV detector 720 and the DL detector 730. It is assumed that camera tilt variation is large and no tilt correction exists, and that near points are less affected by camera tilt variation. In that way, the lane tracker 740 ignores the difference in orientation (e.g., angled, curving left, curving right), length, amount of slope, etc. of lane models in the pair of camera frames, and instead focuses on the location in the frames of near points on the lane models in order to match lane models appearing in one frame to lane models appearing in another frame.

Figure 10D:
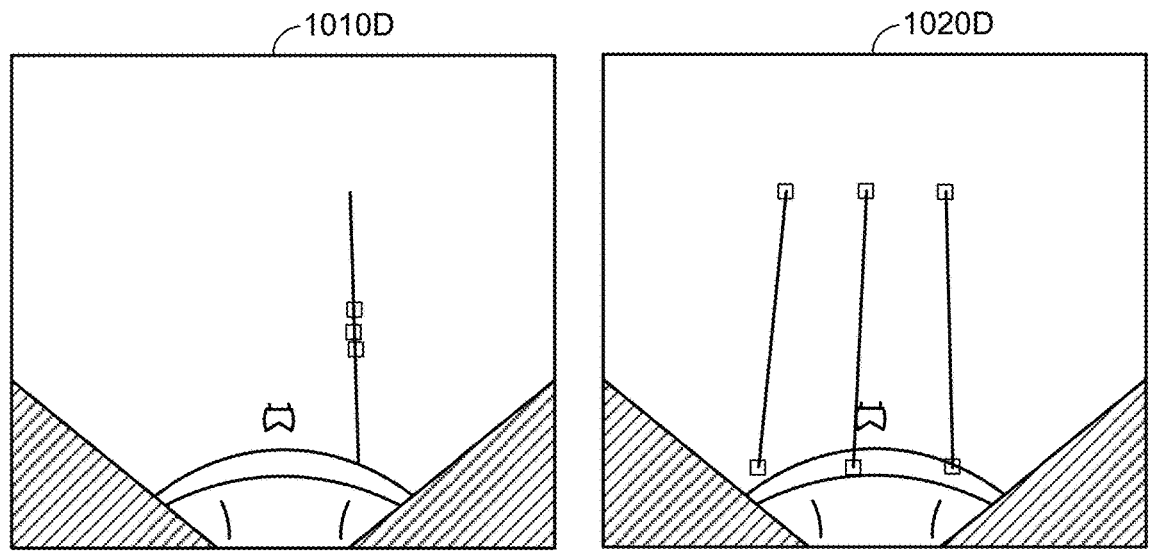
Figure 10E:
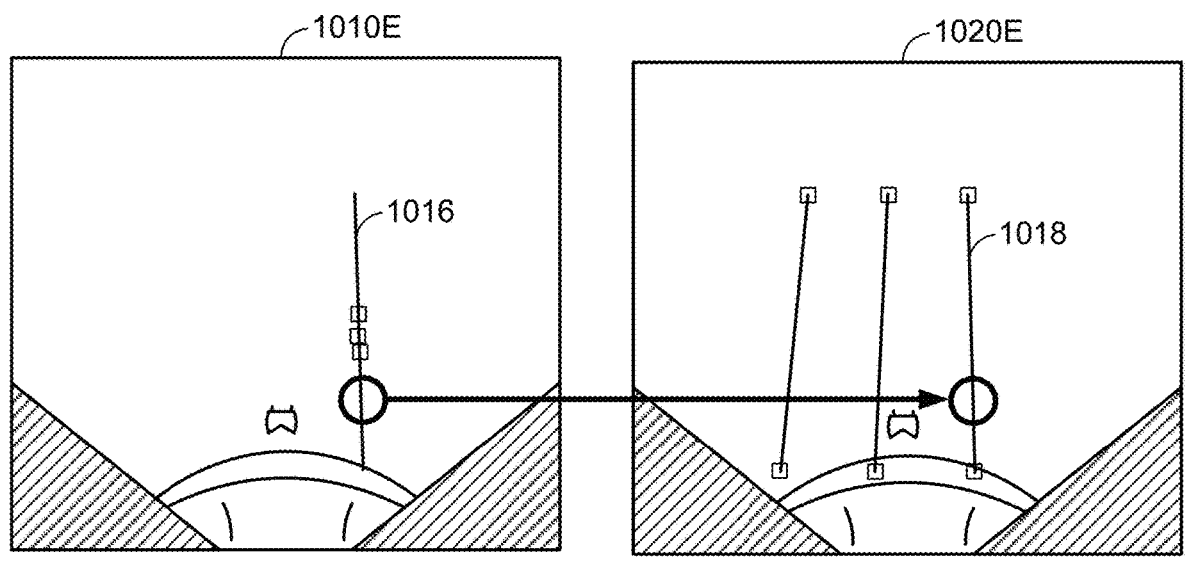

Thus, for example, referring to FIG. 10D, frame 1010D is captured at time t by the CV detector 720 and has a single lane model defined by three points (vertices). Frame 1020D is captured at time t−1 (the previous time step) and has a set of three tracked lane models, each represented by two points (vertices), one at each end of the line since the lane models are in line form. As described above, the DL detector 730 computes lane models for frame t−1 (e.g., frame 1020D) and registers them all as tracking targets (i.e., tracked lane models) for initialization. At frame t (e.g., frame 1010D), each tracked lane model in frame t−1 (e.g., frame 1020D) is tracked using the lane models computed by the CV detector 720 for frame t (e.g., frame 1010D). That is, the lane models computed by the CV detector 720 from frame 1010D (captured at time step t) are used to track the lane models computed by the DL detector 730 from frame 1020D (captured at time step t−1). For example, as shown in the example of FIG. 10E, the far right lane model in frame 1010E matches the far right lane model in frame 1020E because, even though their slopes are slightly different, their near points are the same.

At 910, the lane tracker 740 removes long-term unmatched tracked lane models. That is, if a tracked lane model is unmatched for some threshold period of time or number of frames, the tracked lane model is considered unreliable and removed.

At 912, the lane tracker 740 updates the tracked lane models from the previous frame using the lane models generated from the lanes detected by the CV detector 720 or the DL detector 730 in the current frame. That is, the lane models in the current frame are regarded as the new observations of the detected lanes and the tracked lane models that they match are updated with the lane models in the current frame using a Kalman filter. For example, as illustrated in FIG. 8, the direction of the detection results 820 (i.e., lane models) from the CV detector 720 is different than the direction of the detection results 810 (i.e., lane models) from the DL detector 730, and therefore, the direction of the detection results 810 from the DL detector 730 is updated to match the direction of the detection results 820 from the CV detector 720. In the example of FIG. 10E, the far right lane model 1016 in frame 1010E (which corresponds to frame 1010D, captured at time step t) matches the far right lane model 1018 in frame 1020E (which corresponds to frame 1020D, captured at time step t−1). However, the left two lane models in frame 1020E are unmatched, and may be removed if they remain unmatched for a threshold period of time.

At 914, the lane tracker 740 updates unmatched tracked lane models from the previous frame using tracked lane models from the previous frame that were matched to lane models in the current frame. Specifically, the lane tracker 740 computes the homography between the pair of frames captured at time steps t−1 and t using the matched lane models identified at 908 as reference points. In CV, any two images of the same planar surface are related by a homography, which can be used to associate an object appearing in one image to the same object appearing in a second image. Here, it is assumed that the road surface, which is the surface captured in the pair of frames, is a planar surface. Once the homography matrix is calculated for the pair of frames, it can be used to transform the unmatched tracked lane models to the same orientation, slope, length, etc. as the matched tracked lane models.

Figure 10F:
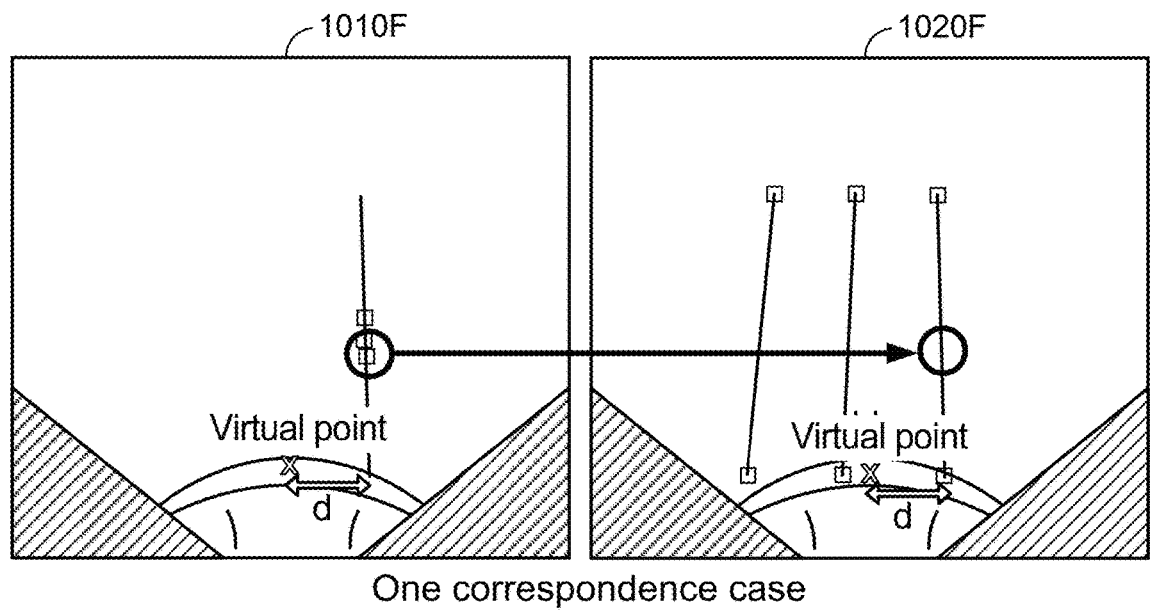
Figure 10F:
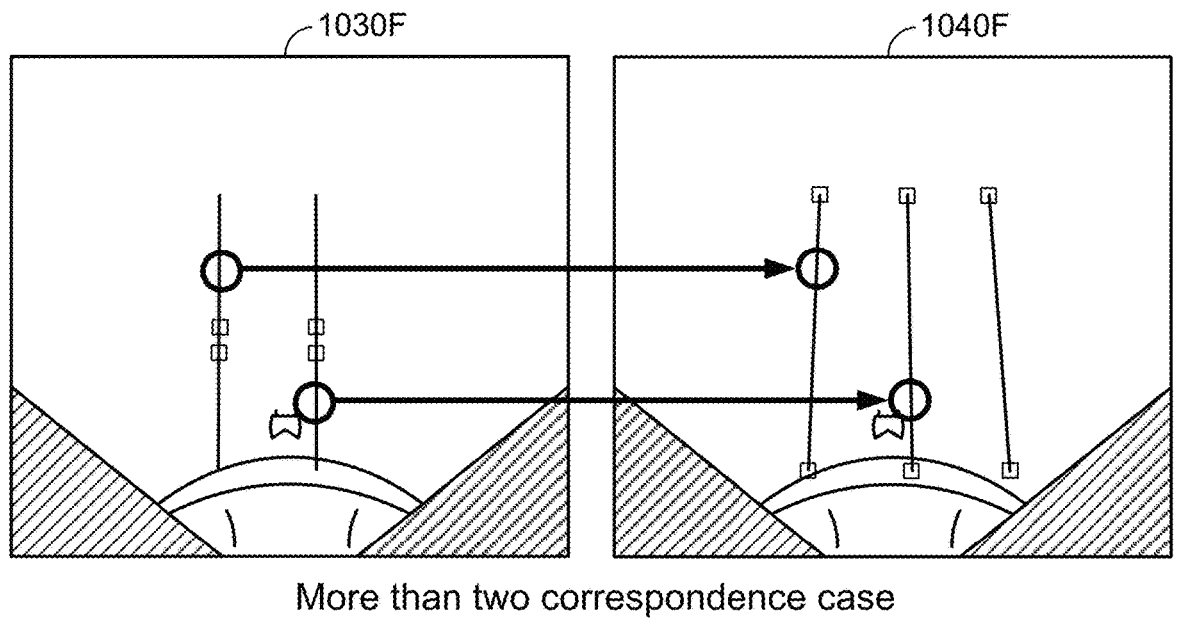

For example, referring to FIG. 10F, if there is only one lane model correspondence between two frames, as in the pair of frames 1010F and 1020F (which may correspond to frames 1010D/E and 1020D/E, respectively), the lane tracker 740 computes the affine or homography matrix of the pair of frames 1010F and 1020F with a virtual near point. More specifically, it is desirable to ensure that a lane model is a straight line or a curved line. In addition, a certain driving directional range z from z-max to z-min can be assumed. Then, a far point and a near point can be obtained from the line or curve within the z range. The near and far points can be identified from the camera frames since a line is shown as a segment. Specifically, the upper end, furthest from the ego vehicle, is the far point and the lower end, closest to the ego vehicle, is the near point.

For correction of unmatched lane models, it is assumed that the road surface is flat. With this assumption, a homography transformation can be applied to the pair of frames (e.g., the frames captured at time steps t−1 and t). To compute a homography from correspondence points (i.e., the same points in two frames), at least four points are needed. As such, at least two lane models are needed, since each lane model for a straight line has two points, the near and far points. To cover the case of only one lane model correspondence (and therefore only two correspondence points), a different method is used. Specifically, an affine transformation is used instead of a homography transformation. However, at least three correspondence points are needed to compute an affine matrix. To solve this issue, a virtual point is set on the same z-axis (driving direction) as the near point of the lane model and a certain distance "d" from the x-axis of the near point, where the "d" can be defined as the maximum width to cover at least one or all of the lane length. From these points, the affine matrix can then be computed.

Figure 10G:
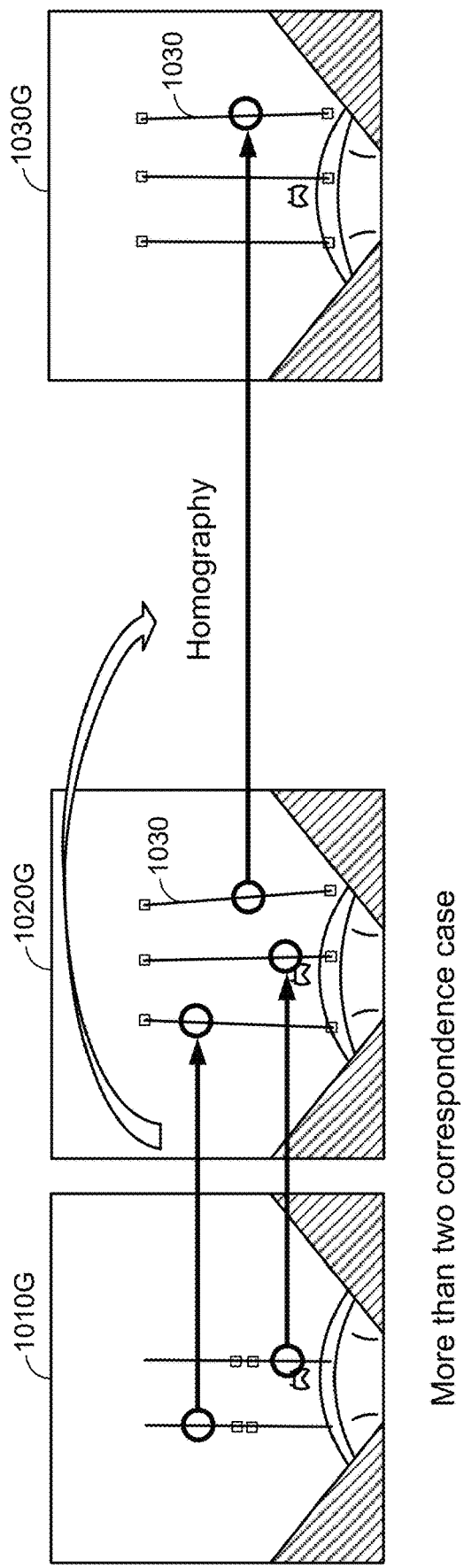
Figure 10H:
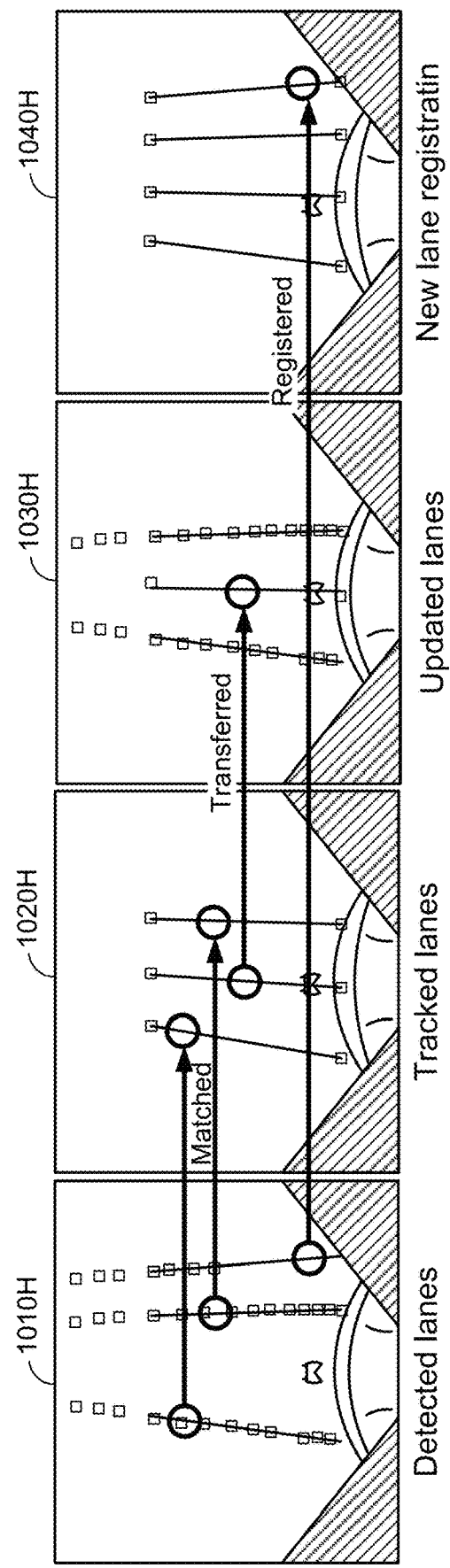

If there are at least two lane model correspondences (i.e., at least four correspondence points), as in the pair of frames 1030F and 1040F, the lane tracker 740 computes the full homography matrix between the frames. Note that a CV detector 720 may be able to detect up to four lanes and a DL detector 730 may be able to detect more than four lanes. As such, there may frequently be more than two lane model correspondences. Then, as illustrated in FIG. 10G, once the homography matrix is calculated for the pair of frames, the lane tracker 740 uses it to transform the unmatched lane model 1030 on the far right of frame 1020G (where frames 1010G and 1020G may correspond to frames 1030F and 1040F, respectively) to the same orientation (slope) as the two matched lane models on the left side of the frames. More specifically, the lane models in frame 1010G may be lane models generated from the detection results (i.e., lane boundary lines) of the CV detector 720 or the DL detector 730 at time step t, and the lane models in frame 1020G may be the most recent tracked lane models from time step t−1. It is assumed that the left and middle lane models in frames 1010G and 1020G are matched from 908. The homography matrix can therefore be computed using the matched tracked lane models. The homography matrix can then be used to update the last unmatched lane model 1030 in frame 1020G.

At 916, the lane tracker 740 registers new tracked lane models using the unmatched detected lane models from the current frame. For example, as illustrated in FIG. 10I, three lane models have been detected in frame 1010H (captured at time step t), and three lane models have been tracked in frame 1020H (captured at time step t−1). Two and three lane models have been tracked in frames 1030H and 1040H, respectively, which may also have been captured at time steps earlier than time step t. The left and middle lane models in frame 1010H have been matched to the outer lane models in frame 1020H. The middle lane model in frame 1020H is transferred to frame 1030H, resulting in that frame having the same lane models as frame 1020H. Said another way, frame 1030H is updated with the missing lane model from frame 1020H. The rightmost lane model in frame 1010H is registered as a new lane model in frame 1040H.

Note that in the description of operation 916, only the results of the DL detector 730 are assumed. That is, only the results of the DL detector 730 may be used for new lane registrations since the results of the CV detector 720 can be relatively unstable (especially for outer lanes). However, in at least one alternative aspect, operation 916 may be performed for the results from both the CV detector 720 and the DL detector 730 if the results from the CV detector 720 are stable.

At 918, the lane tracker 740 transfers lane vertices from the IPM domain back to the image domain. As illustrated in FIGS. 10A to 10H, tracking is performed in the IPM domain, and then the tracking results (i.e., remaining lane models) of each frame in the IPM domain are transferred to the image domain for output. Note that although the foregoing has described tacked lane models as being calculated/determined by the DL detector 730, a "tracked" lane model may be any lane model tracked by either the CV detector 720 or the DL detector 730 in a previous frame (e.g., captured at time step t−1).

Figure 11:
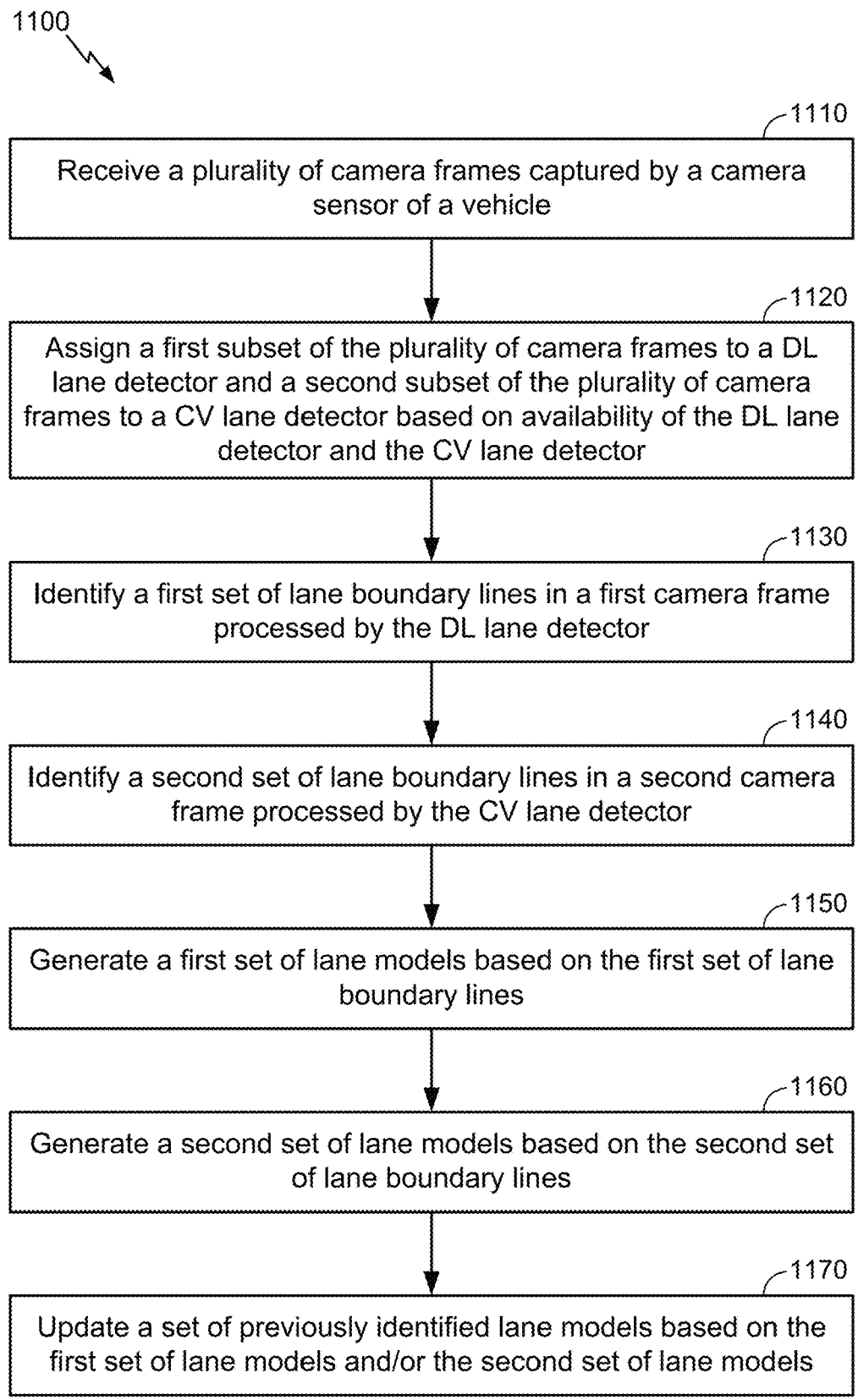
FIG. 11 illustrates an exemplary method for lane estimation, according to aspects of the disclosure.

FIG. 11 illustrates an exemplary method 1100 for lane estimation, according to aspects of the disclosure. The method 1100 may be performed by an ego vehicle (e.g., vehicle 100), and more specifically, the on-board computer (e.g., OBC 200) of the ego vehicle.

At 1110, the on-board computer receives a plurality of camera frames captured by a camera sensor (e.g., camera 212) of the vehicle. In an aspect, operation 1110 may be performed by system interface(s) 210, memory 204, processor(s) 206, and/or scheduler 710, any or all of which may be considered means for performing this operation.

At 1120, the on-board computer assigns a first subset of the plurality of camera frames to a DL detector (e.g., DL detector 730) and a second subset of the plurality of camera frames to a CV detector (e.g., CV detector 720) based on availability of the CV detector and the DL detector. In an aspect, the on-boad computer may assign camera frames of the plurality of camera frames to the DL detector until the DL detector is filled to capacity, and then assign remaining camera frames of the plurality of camera frames to the CV detector until the DL detector is available again, as described above with reference to FIG. 7. In an aspect, the scheduler module may receive feedback from the CV detector and the DL detector indicating their respective available capacities. In an aspect, operation 1120 may be performed by system interface(s) 210, memory 204, processor(s) 206, and/or scheduler 710, any or all of which may be considered means for performing this operation.

At 1130, the on-board computer identifies a first set of lane boundary lines in a first camera frame processed by the DL detector. In an aspect, operation 1130 may be performed by memory 204, processor(s) 206, and/or lane tracker 740, any or all of which may be considered means for performing this operation.

At 1140, the on-board computer identifies a second set of lane boundary lines in a second camera frame processed by the CV detector. In an aspect, operation 1140 may be performed by memory 204, processor(s) 206, and/or lane tracker 740, any or all of which may be considered means for performing this operation.

At 1150, the on-board computer generates a first set of lane models based on the first set of lane boundary lines. In an aspect, operation 1150 may be performed by memory 204, processor(s) 206, and/or lane tracker 740, any or all of which may be considered means for performing this operation.

At 1160, the on-board computer generates a second set of lane models based on the second set of lane boundary lines. In an aspect, operation 1160 may be performed by memory 204, processor(s) 206, and/or lane tracker 740, any or all of which may be considered means for performing this operation.

At 1170, the on-board computer updates a set of previously identified lane models based on the first set of lane models and/or the second set of lane models. In an aspect, operation 1170 may be performed by memory 204, processor(s) 206, and/or lane tracker 740, any or all of which may be considered means for performing this operation.

Although not shown, the on-board computer may output the updated set of lane models to a sensor fusion module (e.g., sensor fusion/RWM module 530) of the vehicle.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying the methods described herein.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of lane estimation comprising:
   receiving a plurality of camera frames captured by a camera sensor of a vehicle;
   assigning a first subset of the plurality of camera frames to a deep learning (DL) detector and a second subset of the plurality of camera frames to a computer vision (CV) detector based on availability of the DL detector and the CV detector;
   identifying a first set of lane boundary lines in a first camera frame processed by the DL detector;
   identifying a second set of lane boundary lines in a second camera frame processed by the CV detector;
   generating a first set of lane models based on the first set of lane boundary lines;
   generating a second set of lane models based on the second set of lane boundary lines; and
   updating a set of previously identified lane models based on the first set of lane models and/or the second set of lane models.

2. The method of claim 1, wherein the first subset of the plurality of camera frames includes one or more camera frames of the second subset of the plurality of camera frames.

3. The method of claim 1, wherein the first subset of the plurality of camera frames includes different camera frames than the second subset of the plurality of camera frames.

4. The method of claim 1, wherein the first subset of the plurality of camera frames is assigned to the DL detector before the second subset of the plurality of camera frames is assigned to the CV detector.

5. The method of claim 1, wherein camera frames of the plurality of camera frames are assigned to the DL detector until the DL detector is filled to capacity, then remaining camera frames of the plurality of camera frames are assigned to the CV detector.

6. The method of claim 1, further comprising:
   receiving feedback from the CV detector and the DL detector indicating respective available capacities.

7. The method of claim 1, further comprising:
   for the first camera frame and the second camera frame, transferring the first set of lane boundary lines and the second set of lane boundary lines from an image plane to an inverse perspective mapping (IPM) domain,
   wherein the first set of lane models and the second set of lane models are generated in the IPM domain based on the transferred first set of lane boundary lines and the transferred second set of lane boundary lines.

8. The method of claim 1, wherein the updating comprises:
   filtering out unstable lane models identified in the first set of lane models and/or the second set of lane models;
   matching one or more lane models of the first set of lane models and/or one or more lane models of the second set of lane models to one or more lane models of the set of previously identified lane models;
   updating the matched one or more lane models of the set of previously identified lane models based on the matched one or more lane models of the first set of lane models and/or the matched one or more lane models of the second set of lane models;
   updating unmatched lane models in the set of previously identified lane models using the matched one or more lane models of the set of previously identified lane models; and
   adding unmatched lane models in the first set of lane models and/or the second set of lane models to the set of previously identified lane models.

9. The method of claim 8, further comprising:
   transferring remaining lane models in the first set of lane models and the second set of lane models from an IPM domain to an image plane.

10. The method of claim 8, wherein:
    the first camera frame and the second camera frame are the same camera frame, and
    both the first set of lane models and the second set of lane models are used to update the set of previously identified lane models.

11. The method of claim 8, wherein:
    the first camera frame is captured before the second camera frame,
    the set of previously identified lane models is the first set of lane models, and
    only the second set of lane models is used to update the set of previously identified lane models.

12. The method of claim 8, wherein:
    the second camera frame is captured before the first camera frame,
    the set of previously identified lane models is the second set of lane models, and
    only the first set of lane models is used to update the set of previously identified lane models.

13. The method of claim 8, further comprising:
    removing lane models from the set of previously identified lane models that have been unmatched longer than a threshold period of time or a threshold number of frames.

14. The method of claim 8, wherein filtering out unstable lane models comprises removing lane models from the first set of lane models and/or the second set of lane models that have a slope greater than a threshold, an x-axis distance greater than a threshold, or an average line-to-points or curve-to-points distance greater than a threshold.

15. The method of claim 8, wherein updating the unmatched lane models comprises:
    computing a homography between the first camera frame or the second camera frame and a previous camera frame; and transforming the unmatched lane models using the homography.

16. The method of claim 15, wherein computing the homography assumes that a road surface on which the vehicle is moving is planar.

17. The method of claim 15, wherein the homography comprises a full homography based on there being two or more corresponding lane models between the first camera frame or the second camera frame and the previous camera frame, or an affine matrix based on there being only one corresponding lane model between the first camera frame or the second camera frame and the previous camera frame.

18. The method of claim 1, further comprising:
outputting the updated set of previously identified lane models.

19. The method of claim 1, wherein generating the first set of lane models comprises fitting a straight line or a curved line to each of the first set of lane boundary lines, and
wherein generating the second set of lane models comprises fitting a straight line or a curved line to each of the second set of lane boundary lines.

20. An apparatus for lane estimation, comprising:
a memory; and
at least one processor coupled to the memory, wherein the at least one processor is configured to:
receive a plurality of camera frames captured by a camera sensor of a vehicle;
assign a first subset of the plurality of camera frames to a deep learning (DL) detector and a second subset of the plurality of camera frames to a computer vision (CV) detector based on availability of the DL detector and the CV detector;
identify a first set of lane boundary lines in a first camera frame processed by the DL detector;
identify a second set of lane boundary lines in a second camera frame processed by the CV detector;
generate a first set of lane models based on the first set of lane boundary lines;
generate a second set of lane models based on the second set of lane boundary lines; and
update a set of previously identified lane models based on the first set of lane models and/or the second set of lane models.

21. The apparatus of claim 20, wherein the first subset of the plurality of camera frames includes one or more camera frames of the second subset of the plurality of camera frames.

22. The apparatus of claim 20, wherein camera frames of the plurality of camera frames are assigned to the DL detector until the DL detector is filled to capacity, then remaining camera frames of the plurality of camera frames are assigned to the CV detector.

23. The apparatus of claim 20, wherein the at least one processor is further configured to:
for the first camera frame and the second camera frame, transfer the first set of lane boundary lines and the second set of lane boundary lines from an image plane to an inverse perspective mapping (IPM) domain,
wherein the first set of lane models and the second set of lane models are generated in the IPM domain based on the transferred first set of lane boundary lines and the transferred second set of lane boundary lines.

24. The apparatus of claim 20, wherein the at least one processor being configured to update comprises the at least one processor being configured to:
filter out unstable lane models identified in the first set of lane models and/or the second set of lane models;
match one or more lane models of the first set of lane models and/or one or more lane models of the second set of lane models to one or more lane models of the set of previously identified lane models;
update the matched one or more lane models of the set of previously identified lane models based on the matched one or more lane models of the first set of lane models and/or the matched one or more lane models of the second set of lane models;
update unmatched lane models in the set of previously identified lane models using the matched one or more lane models of the set of previously identified lane models; and
add unmatched lane models in the first set of lane models and/or the second set of lane models to the set of previously identified lane models.

25. The apparatus of claim 24, wherein:
the first camera frame and the second camera frame are the same camera frame, and
both the first set of lane models and the second set of lane models are used to update the set of previously identified lane models.

26. The apparatus of claim 24, wherein:
the first camera frame is captured before the second camera frame,
the set of previously identified lane models is the first set of lane models, and
only the second set of lane models is used to update the set of previously identified lane models.

27. The apparatus of claim 24, wherein:
the second camera frame is captured before the first camera frame,
the set of previously identified lane models is the second set of lane models, and
only the first set of lane models is used to update the set of previously identified lane models.

28. The apparatus of claim 20, wherein the memory and the at least one processor are components of an on-board computer of the vehicle.

29. An apparatus for lane estimation, comprising:
means for receiving a plurality of camera frames captured by a camera sensor of a vehicle;
means for assigning a first subset of the plurality of camera frames to a deep learning (DL) detector and a second subset of the plurality of camera frames to a computer vision (CV) detector based on availability of the DL detector and the CV detector;
means for identifying a first set of lane boundary lines in a first camera frame processed by the DL detector;
means for identifying a second set of lane boundary lines in a second camera frame processed by the CV detector;
means for generating a first set of lane models based on the first set of lane boundary lines;
means for generating a second set of lane models based on the second set of lane boundary lines; and
means for updating a set of previously identified lane models based on the first set of lane models and/or the second set of lane models.

30. A non-transitory computer-readable medium storing computer-executable instructions, the computer-executable instructions comprising:
at least one instruction instructing at least one processor to receive a plurality of camera frames captured by a camera sensor of a vehicle;
at least one instruction instructing the at least one processor to assign a first subset of the plurality of camera frames to a deep learning (DL) detector and a second subset of the plurality of camera frames to a computer vision (CV) detector based on availability of the DL detector and the CV detector;

at least one instruction instructing the at least one processor to identify a first set of lane boundary lines in a first camera frame processed by the DL detector;

at least one instruction instructing the at least one processor to identify a second set of lane boundary lines in a second camera frame processed by the CV detector;

at least one instruction instructing the at least one processor to generate a first set of lane models based on the first set of lane boundary lines;

at least one instruction instructing the at least one processor to generate a second set of lane models based on the second set of lane boundary lines; and at least one instruction instructing the at least one processor to update a set of previously identified lane models based on the first set of lane models and/or the second set of lane models.

* * * * *